US006732211B1

(12) United States Patent
Goyal et al.

(10) Patent No.: US 6,732,211 B1
(45) Date of Patent: May 4, 2004

(54) INTERCEPTING I/O MULTIPLEXING OPERATIONS INVOLVING CROSS-DOMAIN FILE DESCRIPTOR SETS

(75) Inventors: Pawan Goyal, Mountain View, CA (US); Snorri Gylfason, Mountain View, CA (US); Xun Wilson Huang, Mountain View, CA (US); Srinivasan Keshav, Mountain View, CA (US); Rosen Sharma, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 754 days.

(21) Appl. No.: 09/664,914

(22) Filed: Sep. 18, 2000

(51) Int. Cl.$^7$ .......................... G06F 12/00; G06F 13/24
(52) U.S. Cl. ...................................... 710/261; 707/200
(58) Field of Search ................. 710/261, 266; 707/200, 1, 9, 10

(56) References Cited

U.S. PATENT DOCUMENTS

| | | |
|---|---|---|
| 3,377,624 A | 4/1968 | Nelson et al. |
| 4,177,510 A | 12/1979 | Appell et al. ............... 364/200 |
| 5,212,793 A | 5/1993 | Donica et al. |
| 5,226,160 A | 7/1993 | Waldron et al. |
| 5,249,290 A | 9/1993 | Heizer |
| 5,263,147 A | 11/1993 | Francisco et al. ........... 395/425 |
| 5,325,530 A * | 6/1994 | Mohrmann ................ 717/124 |
| 5,437,032 A | 7/1995 | Wolf et al. |
| 5,528,753 A | 6/1996 | Fortin |
| 5,584,023 A | 12/1996 | Hsu |
| 5,603,020 A | 2/1997 | Hashimoto et al. ......... 395/616 |
| 5,636,371 A | 6/1997 | Yu ............................. 395/500 |
| 5,692,047 A | 11/1997 | McManis ..................... 380/4 |
| 5,706,097 A | 1/1998 | Schelling et al. ........... 358/296 |
| 5,706,453 A | 1/1998 | Cheng et al. |
| 5,708,774 A | 1/1998 | Boden |
| 5,761,477 A | 6/1998 | Wahbe et al. ........... 395/406 A |
| 5,764,889 A | 6/1998 | Ault et al. |
| 5,781,550 A | 7/1998 | Templin et al. ............. 370/401 |
| 5,809,527 A | 9/1998 | Cooper et al. .............. 711/133 |
| 5,828,893 A | 10/1998 | Wied et al. ................. 395/800 |
| 5,838,916 A | 11/1998 | Domenikos et al. ... 395/200.49 |
| 5,842,002 A | 11/1998 | Schnurer et al. ........... 395/500 |
| 5,845,129 A | 12/1998 | Wendorf et al. ........... 395/726 |
| 5,860,004 A | 1/1999 | Fowlow et al. |
| 5,892,968 A * | 4/1999 | Iwasaki et al. ................ 710/1 |

(List continued on next page.)

FOREIGN PATENT DOCUMENTS

WO   WO 99/39261   8/1999

OTHER PUBLICATIONS

Keshav, S., *An Engineering Approach to Computer Networking: ATM Networks, the Internet, and the Telephone Network*, Reading, MA, Addison–Wesley, 1997, pp. vii–xi, 85–115, 209–355, 395–444.

(List continued on next page.)

*Primary Examiner*—Paul R. Myers
(74) *Attorney, Agent, or Firm*—Fenwick & West LLP

(57) ABSTRACT

An I/O multiplexing operation involving a cross-domain file descriptor set is intercepted. The cross-domain set is divided into a first subset corresponding to a first file type and a second subset corresponding to a second file type. System calls are initiated in parallel for performing separate I/O multiplexing operations on the first and second subsets of file descriptors. In response to one of the parallel system calls identifying at least one file descriptor ready for communication, the other parallel system call is unblocked. Sets of file descriptors identified as ready for communication by the parallel system calls are combined and returned to a calling process.

45 Claims, 11 Drawing Sheets

U.S. PATENT DOCUMENTS

| | | | |
|---|---|---|---|
| 5,913,024 A | 6/1999 | Green et al. | 395/186 |
| 5,915,085 A | 6/1999 | Koved | 395/186 |
| 5,918,018 A | 6/1999 | Gooderum et al. | 395/200.55 |
| 5,937,159 A | 8/1999 | Meyers et al. | 395/187.01 |
| 5,956,481 A | 9/1999 | Walsh et al. | 395/186 |
| 6,023,721 A | 2/2000 | Cummings | 709/201 |
| 6,065,118 A | 5/2000 | Bull et al. | 713/200 |
| 6,075,938 A | 6/2000 | Bugnion et al. | 395/500.48 |
| 6,086,623 A | 7/2000 | Broome et al. | |
| 6,108,759 A | 8/2000 | Orcutt et al. | 711/173 |
| 6,167,520 A | 12/2000 | Touboul | 713/200 |
| 6,192,389 B1 | 2/2001 | Ault et al. | 709/101 |
| 6,192,512 B1 | 2/2001 | Chess | 717/5 |
| 6,282,581 B1 | 8/2001 | Moore et al. | |
| 6,470,398 B1 * | 10/2002 | Zargham et al. | 709/318 |
| 6,578,068 B1 | 6/2003 | Bowman-Amuah | |

OTHER PUBLICATIONS

Stevens, R. W., *UNIX Network Programming vol. 1 Networking APIs: Sockets and XTI*, Upper Saddle River, NJ, Prentice Hall, 1998, pp. v–xiv, 29–53, 85–110, 727–760.

Tanenbaum, A. S. and Woodhull, A. S., *Operating Systems: Design and Implementation*, Upper Saddle River, NJ, Prentice Hall, 1997, pp. vii–xiv, 1–46, 401–454.

Rubini, A., *LINUX Device Drivers*, Sebastopol, CA, O'Reilly & Associates, Inc., 1998, pp. v–x, 13–40.

Goyal, P., et al., "A Hierarchical CPU Scheduler for Multimedia Operating Systems," *Proceedings of the Second Symposium on Operating Systems Design and Implementations (OSDI'96)*, Seattle, WA, Oct. 1996, 15 pages.

Laurie, B. and Laurie, P., *Apache The Definitive Guide*, Sebastopol, CA, O'Reilly & Associates, Inc., Feb. 1999, pp. v–viii, 43–74.

Aho, A. V. and Ullman J. D., *Principles of Complier Design*, Reading, MA, 1977, pp. vii–x, 359–362, 519–522.

Jonsson, J., "Exploring the Importance of Preprocessing Operations in Real–Time Multiprocessor Scheduling," *Proc. of the IEEE Real–Time Systems Symposium—Work–in– –Progress session*, San Francisco, CA, Dec. 4, 1997, pp. 31–34.

Rusling, D. A., Processes, [online], [retrieved on Dec. 07, 1999]. Retrieved from the Internet: < URL: http:www.cebaf.gov/~saw/linux/tlk–html/node44.html>.

Rusling, D. A., Linux Processes, [online], [retrieved on Dec. 07, 1999]. Retrieved from the Internet: <URL: http://www-.cebaf.gov/~saw/linux/tlk–html/node45.html>.

Rusling, D. A., Identifiers, [online], [retrieved on Dec. 07, 1999]. Retrieved from the Internet: <URL: http://www.cebaf.gov/~saw/linux/tlk–html/node46.html>.

Rusling, D. A., Scheduling, [online], [retrieved on Dec. 07, 1999]. Retrieved from the Internet: <URL: http://www.cebaf.gov./~saw/linux/tlk–html/node47.html>.

Rusling, D. A., Scheduling in Multiprocessor Systems, [online], [retrieved on Dec. 07, 1999]. Retrieved from the Internet: <URL: http://www.cebaf.gov/~saw/linux/tlk–html/node48.html>.

Rusling, D. A., Files, [online], [retrieved on Dec. 07, 1999]. Retrieved from the Internet: <URL: http://www.cebaf.gov/~saw/linux/tlk–html/node49.html>.

Plummer, D. C., *An Ethernet Address Resolution Protocol—or —Converting Network Protocol Addresses to 48.bit Ethernet Address for Transmission on Ethernet Hardware*, Nov. 1982, [online], [retrieved on Jan. 17, 2000]. Retrieved from the Internet: <URL: http://www.msg.net/kadow/answers/extras/rfc/rfc826.txt>.

Huang, X. W. et al., "The ENTRAPID Protocol Development Environment," *Proceedings of IEEE Infocom'99*, Mar. 1999, nine pages.

Duffield, N.G., et al., "A Flexible Model for Resource Management in Virtual Private Networks," *Computer Communication Review Conference, Computer Communication*, ACM SIGCOMM '99 Conference, Cambridge, MA, Aug. 30, 1999–Sep. 3, 1999, pp. 95–108.

Campbell, A. T. and Keshav, S., "Quality of Service in Distributed Systems," *Computer Communications 21*, 1998, pp. 291–293.

Bach, M. J., *The Design of the Unix® Operating System*, New Delhi, Prentice–Hall of India, 1989, pp. v–x, 19–37.

McDougall, R., et al., *Resource Management*, Upper Saddle River, NJ, Prentice Hall, 1999, pp. iii–xix, 135–191.

Rijsinghani, A., RFC 1624, May 1994, [online], [retrieved Feb. 02, 2000]. retrieved from the internet: <URL: http://www.faqs.org/rfcs/rfc1624.html>.

Mallory, T and Kullberg, A., RFC 1141, Jan. 1990 [online], [retreived Feb. 02, 2000]. retrieved from the Internet: <URL: http://www.faqs.org/rfcs/rfc1441.html>.

Egevang, K. and Francis P., RFC 1631, May 1994 [online], [retrieved Feb. 02, 2000]. retrieved from the Internet: <URL: http://www.faqs.org/rfcs/rfc1631.html>.

Goyal, P. et al "Start–time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the internet: <URL: http://cs.cornell.edu/Info/Courses/Spring–97/CS614/goy.html>.

Goyal, P., "Packet Scheduling Algorithms for Integrated Services Networks," PhD Dissertation, University of Texas, Austin, TX, Aug. 1997.

Pending U.S. patent application entitled "Providing Quality of Service Guarantees to Virtual Hosts," Ser. No. 09/452, 286, filing date Nov. 30, 1999.

Pending U.S patent application entitled "Selective Interception of System Calls," Ser. No. 09/499,098, filing date Feb. 4, 2000.

Pending U.S. patent application entitled "Dynamic Scheduling of Task Streams in a Multiple–Resource System to Ensure Task Stream Quality of Service," Ser. No. 09/498, 450, filing date Feb. 4, 2000.

Pending U.S. patent application entitled "Disambiguating File Descriptors," Ser. No. 09/500,212, filing date Feb. 8, 2000.

Pending U.S. patent application entitled "Restricting Communication Between Network Devices on a Common Network," Ser. No. 09/502,155, filing date Feb. 11, 2000.

Pending U.S. patent application entitled "Restricting Communication of Selected Processes to a Set of Specific Network Addresses," Ser. No. 09/503,975, filing date Feb. 14, 2000.

Pending U.S. patent application entitled "Enabling a Service Provider to Provide Intranet Services," Ser. No. 09/526,980, filing date Mar. 15, 2000.

Pending U.S. patent application entitled "Dynamically Modifying the Resources of a Virtual Server," Ser. No. 09/569,371, filing date May 11, 2000.

Pending U.S. patent application entitled "Regulating File Access Rates According to File Type," Ser. No. 09/572,672, filing date May 16, 2000.

Pending U.S. patent application entitled "Modifying Internal Components of a Running Operating System," Ser. No. 09/576,393, filing date May 22, 2000.

Pending U.S. patent application entitled "Associating Identifiers With Virtual Processes," Ser. No. 09/611,877, filing date Jul. 7, 2000.

Pending U.S. patent application entitled "Fairly Partitioning Resources While Limiting the Maximum Fair Share," Ser. No. 09/633,575 filing date Aug. 7, 2000.

Boehm, B., "Managing Software Productivity and Reuse," IEEE Computer, Vol. 32, No. 9, Sep. 1999, 3 pages.

Corbato, F. J. et al. "An Experimental Timesharing System," Proceedings of the American Federation Of Information Processing Societies Spring Joint Computer Conference, San Francisco, CA, May 1–3, 1962, pp. 335–344.

Deutsch, P. and Grant, C.A., "A Flexible Measurement Tool for Software Systems," Information Processing 71 (Proc. of the IFIP Congress), 1971, pp. 320–326.

Edijali, G., et al., "History–based Access Control for Mobile Code," Fifth ACM Conference on Computer and Communication Security, Nov. 3–5, 1998, 19 pages.

Erlingsson, U. and Schneider, F. B., "SASI Enforcement of Security Policies: A Retrospective," Proc. New Security Paradigms Workshop, Apr. 2, 1999, pp. 1–17.

Erlingsson, U. and Schneider, F.B., IRM Enforcement of Java Stack Inspection, [online], Feb. 19, 2000, [retrieved on Apr. 02, 2002]. Retrieved from the Internet: <URL: http://cs–tr.cs.cornell.edu/Dienst/UI2.0/Show Page/ncstrl.cornell/TR2000–1786>.

Evans, D. and Twyman, A., "Flexible Policy–Directed Code Safety," Proc. of 1999 IEEE Symposium on Security and Privacy, Oakland, CA, May 9–12, 1999, pp. 1–14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixth USENIX UNIX Security Symposium, San Jose, CA, Jul. 1996, 14 pages.

Goldberg, R. P., "Survey of Virtual Machine Research," IEEE Computer, Jun. 1974, pp. 34–45.

Pandey, R. and Hashii, B., "Providing Fine–Grained Access Control For Mobile Programs Through Binary Editing," Technical Report TR98 08, University of California, Davis, CA, 1998, pp. 1–22.

Ritchie, D. M., "The Evolution of the Unix Time–Sharing System," AT&T Bell Laboratories Technical Journal 63, No. 6, Part 2, Oct. 1984, (originally presented 1979), 11 pages.

Saltzer, J., H. and Schroeder, M. D., The Protection of Information in Computer Systems, [online], 1973, [retrieved on Apr. 02, 2002]. Retrieved from the Internet: <URL: http://www.cs.virginia.edu~evans/cs551/saltzer/>.

Wahbe, R., et al., "Efficient Software–Based Fault Isolation," Proc. of the Symposium on Operating System Principles, 1993, 14 pages.

* cited by examiner

INTERCEPTING I/O MULTIPLEXING OPERATIONS INVOLVING CROSS-DOMAIN FILE DESCRIPTOR SETS

BACKGROUND OF THE INVENTION

1. Field of the Invention

The present invention relates generally to computer operating systems, and more particularly, to techniques for intercepting I/O multiplexing operations involving cross-domain file descriptor sets.

2. Description of the Background Art

Operating systems such as UNIX® and Microsoft WINDOWS NT® are widely used in commercial computing systems. Among their many uses, these operating systems are commonly deployed on Internet and other network server computers. With the popularity and success of the Internet, operating systems for network servers are currently of great commercial importance.

Frequently, intercepting system calls that pertain to accessing files is desirable. Although operating systems include various internal resources for accessing a file system, it is often desirable to customize or extend operating system functionality for a particular use. Such customization allows a computer programmer, a network administrator, or a webmaster to utilize the operating system in a specific manner beyond the default system capabilities provided by the manufacturer of the operating system. The interception of system calls is one such method of extending and expanding operating system functionality.

A system call is a subroutine, the object code of which is located in the operating system. Such subroutines are normally called by processes (applications) executing under the control of the operating system. When executed, a system call performs some system operation, such as accessing a system hardware device or a software resource. Examples of operations executed by system calls may include reading data from a file, opening a network communication channel, and allocating computer memory to a specific process.

A system call vector table typically stores pointers to the executable code of the system calls. In order to make a system call, arguments are programmatically loaded into specific registers of the central processing unit (CPU) of the computer on which the operating system is executing. One of these arguments identifies the specific system call that is being made. This argument is typically in the form of a number that is an offset into the system call vector table. The other loaded arguments include parameters to be passed to the system call.

Once the arguments have been loaded, a software interrupt is normally generated, signaling to the operating system that a process is requesting execution of a system call. The operating system reads the registers, and executes the requested system call with the specified parameters. The system call executes and performs the desired functionality. If the system call generates a return value, it places the generated return value (or a pointer thereto) in a pre-designated register where it can be accessed by the calling process.

In order to intercept a system call, a pointer in the system call vector table to the system call is replaced with a pointer to alternative object code to be executed instead of the system call. As a result, when the operating system reads the system call vector table in response to the system call being requested, the operating system will read the pointer to the alternative object code, and the alternative object code will execute instead of the system call. The alternative object code is typically known as a "system call wrapper."

The interception of system calls providing access to the file system is useful in extending and customizing operating system functionality. For example, the interception of system calls may be used to manipulate operating system access privileges to provide security beyond that which is provided by the operating system. By intercepting system calls that provide access to the file system, processes can be prevented from deleting, modifying, creating, or even reading files. This is desirable, for example, when a user wishes to remotely execute a program residing on a web server, but does not want the remote program to be able to read or alter private data on the user's computer. Today, Java® applets are commonly employed to provide such security. However, many programs that users wish to remotely execute are written in languages other than Java®. System call interception has the potential to allow the safe execution of programs written in all languages.

The interception of system calls is known today, although it is an advanced programming technique. Nonetheless, a serious shortcoming limits the usefulness of intercepting system calls that provide access to the file system. That shortcoming is the inability to disambiguate between a file descriptor that is associated with a file stored on media (e.g., hard disk, optical disk, random access memory) and a file descriptor that is associated with a communication channel (e.g., referred to as a "socket" in UNIX®).

Many computer operating systems utilize file descriptors to provide access to file systems. Under such operating systems, a file is created by making a system call that creates a file and returns a file descriptor that is associated with the newly created file. Subsequently, the file is accessed via the file descriptor. Examples of file access operations include reading from a file, writing to a file, closing a file, and deleting a file. Such operations are typically conducted by making a designated system call, and passing the system call the file descriptor that is associated with the file being accessed.

Many commercially popular operating systems such as UNIX® and Microsoft WINDOWS NT® treat communication channels as files. In such an operating system, when a process makes a system call in order to establish a communication channel, the operating system returns a file descriptor. The communication channel is subsequently accessed via the file descriptor, in a similar manner as a file stored on media.

Commonly, the same system calls are made to perform the same access operations on both files stored on media and on communication channels. For example, under the UNIX® operating system, a read system call can be made in order to read data from either a file stored on media or from a communication channel. The system call itself has no information concerning the file type with which a file descriptor is associated. The system call simply executes instructions to access a file in a specific manner via a file descriptor. For example, the read system call executes instructions to copy a specific number of bytes from a file to a buffer in memory. The read system call does not distinguish between a file on media and a communication channel.

Likewise, a system call wrapper that executes when such a system call is intercepted conventionally has no mechanism for distinguishing between file types. For example, if the read system call is intercepted, the system call wrapper will execute whenever any process makes the system call to read data from any type of file. Thus, the system call wrapper will execute whenever a process attempts to read data from a file stored on media and also whenever a process attempts to read data from a communication channel.

Communication channels and files stored on media are inherently different, despite the fact that both are accessed via file descriptors. Thus, it is often desirable to intercept system calls that access a file stored on media, but not to intercept system calls that access a communication channel. Likewise, it is often desirable to intercept system calls that access a communication channel, but not to intercept system calls that access a file stored on media.

For example, as noted above, it is sometimes desirable only to intercept system calls that access files stored on media. The desired result is to prevent access to files stored on media, but not to prevent access to communication channels. At the same time, it may be undesirable to prevent write access to the communication channels of the client computer, because it would be desirable for the computer to be able to receive communication responses from web servers. However, intercepting every write system call and executing a system call wrapper in its place to prevent write access would prevent write access to both communication channels and to files stored on media.

Likewise, it is often desirable to intercept system calls that pertain to access of communication channels, but not to intercept system calls that pertain to access of files stored on media. For example, it may be desirable to disallow remote communication requests made to a certain computer, but at the same time allow local access to files stored on media of the computer. Again, because the same system call is used to access communication channels and files stored on media, the one can not be prevented and yet the other allowed without a means for disambiguating the file descriptors.

Moreover, under some operating systems, entities other than communication channels and files stored on media are treated as files, and hence accessed via file descriptors. For example, under the UNIX® operating system, hardware devices are designated by file descriptors. For the same reasons that it is desirable to disambiguate communication channel file descriptors from file descriptors that are associated with files stored on media, it is further desirable to disambiguate file descriptors that are associated with any type of file from those that are associated with any other type.

Accordingly, what is needed is a method for disambiguating file descriptors generally, and, specifically, for disambiguating file descriptors that are associated with files stored on media from file descriptors that are associated with communication channels. This allows for the selective interception of system calls that access one type of file or another.

Certain system calls, such as I/O multiplexing functions, may operate on multiple file descriptors, some of which may correspond to different file types. For example, the UNIX® select ( ) and poll ( ) system calls allow a process to instruct the kernel to wait for any one of a set of file descriptors to become ready for I/O. Such "multiplexing" operations are extremely advantageous when a process needs to simultaneously handle multiple file descriptors, such as file descriptors for both interactive input (e.g., standard input) and network communication channels (e.g., sockets).

Most file accesses in UNIX® use a "blocking" I/O model. For instance, when a process is waiting to read from a communication channel, the process is normally put to sleep, i.e. blocked, until the data to be read becomes available. However, while the process is blocked, it may not normally receive data from another file or process. I/O multiplexing operations solve this problem by allowing a process to wait for any one of multiple events, and to wake the process only when one of the events has actually occurred.

As previously noted, communication channels and files stored on media are inherently different, despite the fact that both are accessed via file descriptors. Thus, it is often desirable to intercept system calls that access a file stored on media, but not to intercept system calls that access a communication channel, and vice versa.

However, in the context of an I/O multiplexing operation, a single system call (e.g., select or poll) operates on a mixed set of file descriptors, some of which may correspond to communication channels and others which may correspond to files stored on media. As used herein, a set of file descriptors of mixed file types is referred to as a "cross-domain" set.

In many cases, it would be desirable to intercept the processing of certain types of file descriptors within a single I/O multiplexing operation, while permitting other file descriptors to be handled in a conventional manner. However, such selective interception of functionality within a single system call presents even more difficulties than simply disambiguating file descriptors and deciding whether or not to execute alternative code within a system call wrapper.

Accordingly, what is needed is a method for intercepting I/O multiplexing operations involving cross-domain file descriptor sets, e.g., file descriptor sets including more than one file type. What is also needed is a method for intercepting I/O multiplexing operations wherein one type of file descriptor receives special processing not required by another type of file descriptor.

SUMMARY OF THE INVENTION

The present invention allows disambiguation of file descriptors, generally, and disambiguation of communication channel file descriptors from file descriptors that are associated with files stored on media, specifically. The disambiguation process involves storing indicators concerning file descriptors that are associated with a specific file type. When file descriptors are subsequently utilized to access files, the indicators are examined in order to determine the associated file type.

Another aspect of the invention relates to intercepting I/O multiplexing operations involving cross-domain file descriptor sets. In one embodiment, a system call for performing an I/O multiplexing operation on a set of file descriptors is intercepted by a system call wrapper. The system call wrapper then divides the set of file descriptors into a first subset corresponding to a first file type and a second subset corresponding to a second file type. This may be accomplished by referencing a table of indicators, as discussed above.

In one implementation, the system call wrapper establishes a private connection with a functional module. The connection may be identified by a virtual file descriptor, which is used in both the system call wrapper and the functional module for this purpose. The system call wrapper adds the virtual file descriptor, in one embodiment, to each of the first and second subsets of file descriptors.

After the subsets are modified, the system call wrapper and the functional module initiate system calls in parallel for performing separate I/O multiplexing operations on the first and second subsets of file descriptors. In response to the wrapper's system call returning with an indication that at least one file descriptor is ready for communication, the wrapper performs an I/O operation (e.g., read or write) using the virtual file descriptor, which unblocks, if necessary, the functional module's system call. Likewise, in response to the functional module's system call returning with an indication that at least one file descriptor is ready for communication, the functional module performs an I/O operation (e.g., read or write) using the virtual file descriptor, which unblocks, if necessary, the wrapper's system call.

The system call wrapper then combines the sets of file descriptors that are ready for I/O returned by the parallel system calls. Thereafter, the system call wrapper returns the combined sets of file descriptors to the calling process.

The above-described technique for intercepting an I/O multiplexing operation facilitates special handling of one or more of the file types. For example, special code may be included within the functional module for processing file descriptors relating to communication channels or other types of files. Moreover, the implementation of one or both of the I/O multiplexing operations may be modified to process certain types of file descriptors in non-standard ways. In certain embodiments, either the system call wrapper or the functional module may be associated with a customized communication protocol stack, which provides significant control over the handling of file descriptors.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the illustrated structures and methods may be employed without departing from the principles of the invention described herein.

DETAILED DESCRIPTION OF THE PREFERRED EMBODIMENTS

I. Overview

The present invention relates to intercepting I/O multiplexing operations involving cross-domain file descriptor sets. As noted, a cross-domain file descriptor set includes file descriptors of more than one file type, examples of which are communication channels and file stores on media.

As described more fully hereafter, one aspect of intercepting I/O multiplexing operations involves disambiguating file descriptors. In many operating systems, such as UNIX®, a system call has no information concerning the file type with which a file descriptor is associated. The system call simply executes instructions to access a file in a specific manner via a file descriptor, without reference to whether the file is a communication channel or a file stored on media.

Figure 1:
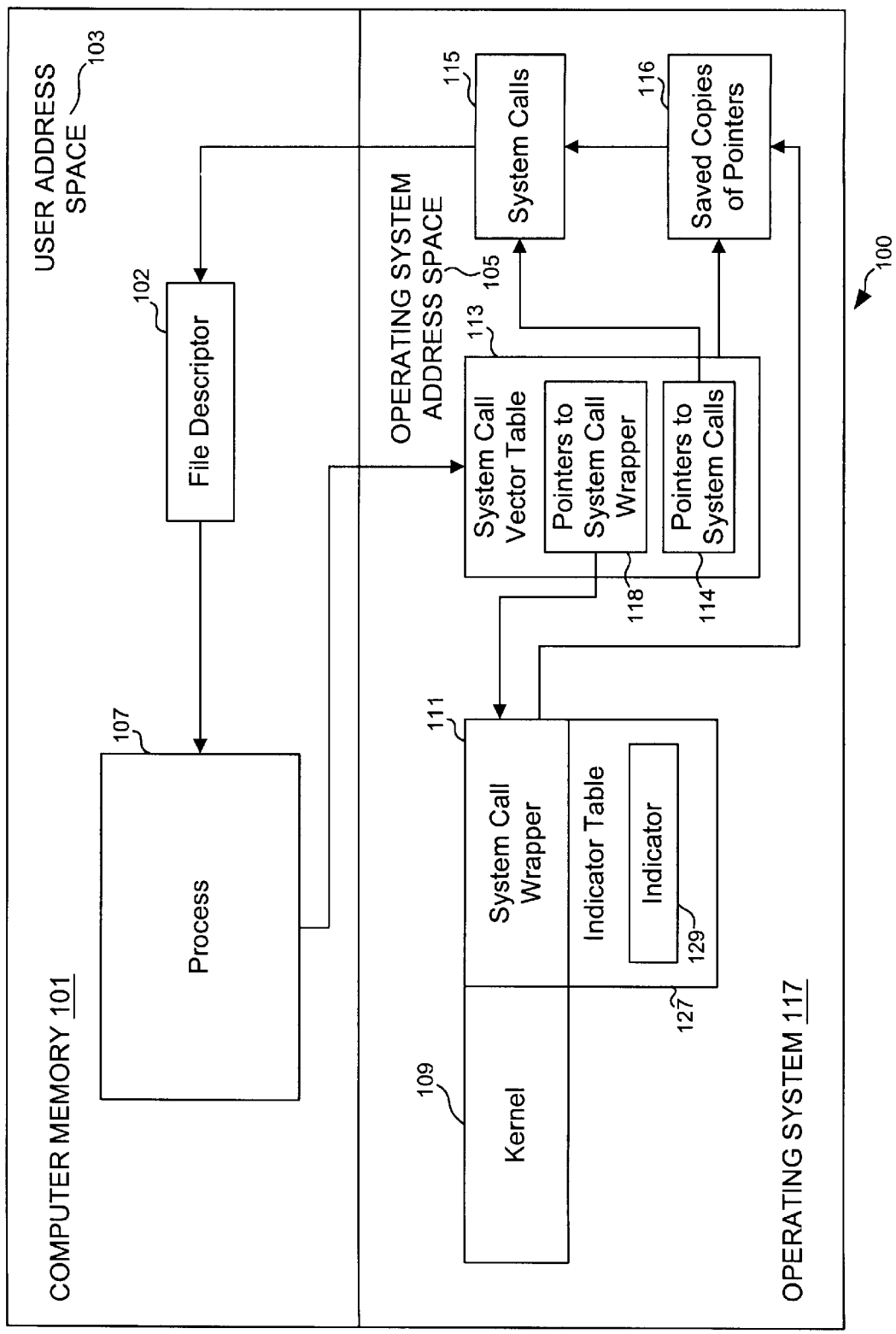
FIG. 1 is a high level block diagram illustrating a system for disambiguating file descriptors according to one embodiment of the present invention.
Figure 2:
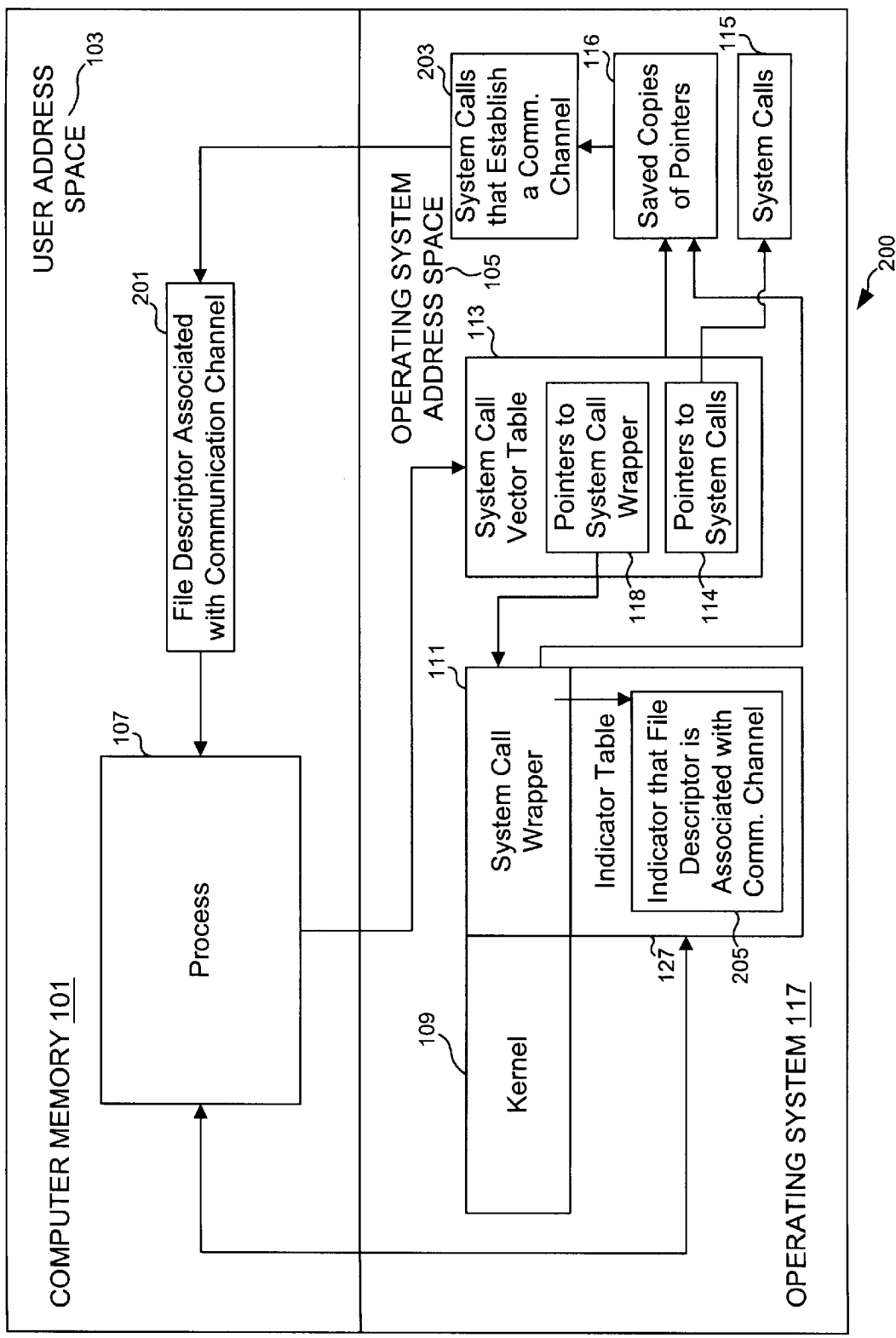
FIG. 2 is a block diagram illustrating a system for maintaining and utilizing an indicator table in order to disambiguate file descriptors that are associated with communication channels from those that are not according to one embodiment of the present invention.

FIGS. 1–4 illustrate techniques for disambiguating file descriptors according to file type. For example, FIG. 2 illustrates a system for disambiguating file descriptors relating to communication channels from file descriptors relating to other types of files. In one embodiment, as described hereafter, an indicator table or other suitable data structure may be used for storing indicators that a file descriptor is associated with a communication channel (or other file type).

Techniques for actually intercepting I/O multiplexing operations are described more fully with reference to FIGS. 5–11. Such techniques may rely on the indicator tables discussed above in order to differentiate between file descriptors relating to different file types.

II. Disambiguating File Descriptors Related to Communication Channels

FIG. 1 illustrates a system 100 for disambiguating file descriptors 102 according to one embodiment of the present invention. A computer memory 101 includes a user address space 103 and an operating system address space 105. A process 107 executes in the user address space 103. Although FIG. 1 illustrates only a single process 107 executing in the user address space 103, it is to be understood that within a given computer memory 101, multiple processes 107 can execute simultaneously.

In order to disambiguate file descriptors 102, certain system calls 115 are intercepted. The interception of specific system calls 115 in order to disambiguate file descriptors 102 is described in detail below. In order to intercept system calls 115, techniques known in the art are utilized to insert a system call wrapper 111 into the operating system 117. In a preferred embodiment, a system call wrapper 111 is dynamically loaded into the operating system kernel 109, while the kernel 109 is active. The system call wrapper 111 is preferably in the form of object code, the functional features of which are described in detail below. Preferably, a single system call wrapper 111 that includes all of the code object described below is loaded into the operating system kernel 109. In alternative embodiments, multiple system calls wrappers 111 are loaded, each system call wrapper 111 including a subset of the object code.

Pointers 114 to system calls 115 are located in an operating system call vector table 113. It is to be understood that the term "system call vector table" as used herein denotes an area in the operating system address space 105 in which there are stored the addresses of system calls. In the UNIX® operating system, this part of the operating system is called the "system call vector table," and that term is used in this specification. Other operating systems employ different terminology to denote the same system component. A system call vector table by any other name is still within the scope of the present invention.

A copy 116 is made of a pointer 114 to each system call 115 to be intercepted. These copies 116 of pointers 114 are preferably stored in the operating system address space 105, but in an alternative embodiment are stored in the user address space 103. Once the copies 116 have been made and saved, the pointers 114 in the system call vector table 113 to the system calls 115 to be intercepted are replaced with pointers 118 to the system call wrapper 111, such that when a system call 115 to be intercepted is made, the system call wrapper 111 executes instead. In one embodiment of the present invention, this copying, storing, and replacing of pointers is performed by the system call wrapper 111. In other embodiments, copying, storing, and replacing of pointers is performed by a pointer management module executing in either the operating system address space 105 or the user address space 103 as desired. The pointer management module can either be a stand alone program, or a component of a larger application program as desired.

Executing alternative code when a system call 115 is made comprises intercepting the system call 115. The steps of inserting a system call wrapper 111 into the operating system 117, making a copy 116 of an operating system pointer 114 to a system call 115, and replacing the operating system pointer 114 with a pointer 118 to the system call wrapper 111 facilitate interception of a system call 115. When a system call 115 to be intercepted is made, the operating system 117 uses the pointer 118 in the system call vector table 113 to the system call wrapper 111 to execute the system call wrapper 111.

It is to be understood that in the present invention, not all system calls 115 are intercepted. Only pointers 114 to system calls 115 to be intercepted are replaced with pointers 118 to the system call wrapper 111. Pointers 114 to system calls 115 which are not to be intercepted are not replaced. Thus, when a non-intercepted system call 115 is made, the system call 115 executes, not the system call wrapper 111.

In one embodiment, a data structure for storing indicators 129 is inserted into the operating system 117. The data structure may include an indicator table 127, but other data structures may be utilized, one example of which is a linked list. In one implementation, the indicator table 127 (or other data structure) is dynamically loaded into the operating system kernel 109 while the kernel 109 is active. In another embodiment, the indicator table 127 is stored in the user address space 103. Regardless, the system call wrapper 111 maintains the indicator table 127 so that the indicator table 127 includes, for each file descriptor 102 that is associated with a specific file type, an indicator 129 of the association. The maintenance and use of the indicator table 127 is discussed in detail below.

FIG. 2 illustrates a system 200 for maintaining and utilizing a table 127 of indicators 205 concerning communication channel file descriptors 201 in order to disambiguate file descriptors 201 that are associated with communication channels from file descriptors 102 that are not, according to one embodiment of the present invention.

As used herein, the term "communication channel" refers to a logical interface by which communication can be conducted. A communication channel is typically, although not necessarily, associated with both a network address and a port. Typically, separate communication channels must be present at each end of a communication session. A communication channel is sometimes denoted by the words "communication channel end" or "communication channel end point." In UNIX®, communication channels are referred to as "sockets," although the invention is not limited to any specific terminology or operating system.

In the embodiment of FIG. 2, system calls 203 that establish a communication channel are intercepted. Examples of such system calls 203 are the UNIX® socket function and the UNIX® accept function. It is to be understood that the names of the system calls 203 vary from operating system 117 to operating system 117. The present invention is not limited to any specific operating system 117, or to any specific system call name. Some operating systems 117 include a single system call 203 that establishes a communication channel. Other operating systems 117 include more than one such system call 203.

To prepare to intercept system calls 203 that establish a communication channel, internal operating system pointers 114 in the system call vector table 113 to such system calls 203 are copied. The copies of the pointers 116 may be stored in the operating system address space 105 or in the user address space 103, as desired. The pointers 114 in the system call vector table 113 to the system calls 203 are replaced with pointers 118 to the system call wrapper 111, such that when the system calls 203 are made, the system call wrapper 111 is executed instead.

When a system call 203 is made, the operating system 117 uses the pointer 118 in the system call vector table 113 to execute the system call wrapper 111. The system call wrapper 111 first utilizes the saved copy of the pointer 116 to make the system call 203. The system call 203 then executes, establishing the communication channel. After having established the communication channel, the system call 203 returns a file descriptor associated with the established communication channel 201. This file descriptor 201 is to be used by processes 107 in order to access the established communication channel. After the system call 203 terminates, the system call wrapper 111 stores (in the indicator table 127) an indicator 205 that the file descriptor 201 returned by the system call 203 is associated with a communication channel.

In order to keep the indicator table 127 current, system calls 115 that create a copy of a file, a copy of a file descriptor 102, or a copy of an operating system file descriptor 102 table are also intercepted. In one embodiment, a system call 115 that copies a file also copies a file descriptor 102, e.g., when a new file (the copy of the original file) is created, a new file descriptor 102 is also created, the new file descriptor 102 being associated with the new file. In another embodiment, when a process forks, the child process inherits a copy of all of the file descriptors owned by the parent. In such an embodiment, copies of file descriptors are not made if files are copied.

To prepare to intercept system calls 115 that create a copy of a file, a copy of a file descriptor 102, or a copy of an operating system file descriptor 102 table, copies 116 are made of internal operating system pointers 114 in the system call vector table 113 to such system calls 115. The pointers 114 in the system call vector table 113 to these system calls 115 are replaced with pointers 118 to the system call wrapper 111, such that when the system calls 115 are made, the system call wrapper 111 is executed instead.

Whenever any process 107 makes a system call 115 to copy a file, the system call wrapper 111 executes. First, the system call wrapper 111 checks the indicator table 127 to determine whether the file descriptor 102 associated with the file to be copied is associated with a communication channel. If so, the copy of the file, and hence the descriptor 201, will also be associated with a communication channel. The system call wrapper 111 utilizes the copy of the pointer 116 to execute the system call 115. The system call 115 executes and creates a copy of the file, and also a copy of its associated file descriptor 201 (in an alternative embodiment, the system call wrapper 111 creates the copies itself, rather than making the system call 115).

After the system call 115 exits, the system call wrapper 111 stores an indicator 205 in the indicator table 127 that the file descriptor 201 associated with the copy of the file is associated with a communication channel. If the file to be copied is not associated with a communication channel, the system call wrapper 111 simply makes the system call 115 such that execution control returns to the calling process 107 after the system call 115 executes.

Some system calls 115 simply copy an existing file descriptor 102, without copying its associated file. These system calls 115 are also intercepted. When a communication channel file descriptor 201 is copied, the system call wrapper 111 stores an indicator 205 in the indicator table 127 that the copy of the file descriptor 201 is associated with a communication channel.

System calls 115 that copy an entire file descriptor 102 table are also intercepted. For each file descriptor 102 in the file descriptor 102 table, the system call wrapper 111 checks the indicator table 127 to determine whether the file descriptor 102 is associated with a communication channel. The system call wrapper 111 then utilizes the copy of the pointer 116 to execute the system call 115. The system call 115 executes and creates a copy of the file descriptor 102 table. After the system call 115 exits, the system call wrapper 111 stores, for each communication channel file descriptor 201 in the file descriptor 102 table, an indicator 205 that the created copy of the file descriptor 201 is associated with a communication channel.

In order to keep the indicator table 127 current, system calls 115 that delete a file descriptor 102 are also intercepted. Note that a system call 115 that deletes a file also deletes the associated descriptor 102 of the file. Thus, system calls 115 that delete a file descriptor 102 include both system calls 115 that delete a file descriptor 102 only and system calls 115 that delete a file and its associated descriptor 102.

Whenever a process 107 makes a system call 115 to delete a file descriptor 102, the system call wrapper 111 executes instead. The system call wrapper 111 checks the indicator table 127 to determine whether the file descriptor 102 to be deleted is associated with a communication channel. If so, the system call wrapper 111 utilizes the copy of the pointer 116 to execute the system call 115, which deletes the file descriptor 201 (in an alternative embodiment, the system call wrapper 111 deletes the file descriptor 201 itself, rather than making the system call 115).

After the system call 115 exits, the system call wrapper 111 deletes the indicator 205 in the indicator table 127 that the file descriptor 201 is associated with a communication channel. This is appropriate, because the file descriptor 201 no longer exists. If the file descriptor 102 to be deleted is not associated with a communication channel, the system call wrapper 111 simply makes the system call 115 such that execution control returns to the calling process 107 after the system call 115 executes.

Thus, system calls 203 that establish a communication channel are intercepted. When these system calls 203 are made, the system call wrapper 111 executes and stores, in the indicator table 127, an indicator 205 that the file descriptor 201 of the established communication channel is a communication channel file descriptor 201. System calls 115 that copy or delete file descriptors 102 are also intercepted. If a file descriptor 201 that is associated with a communication channel is copied or deleted, the system call wrapper 111 updates the indicator table 127 appropriately. Thus, the indicator table 127 includes an indicator 205 for every existing file descriptor that is associated with a communication channel 201.

Because the indicator table 127 includes indicators 205 for file descriptors 201 that are associated with communication channels, the indicator table 127 can be utilized to determine whether or not a specific file descriptor 102 is associated with a communication channel. The indicator table 127 can be examined to determine if an indicator 205 concerning the specific file descriptor 102 is present. If so, the file descriptor 201 is associated with a communication channel. If no such indicator 205 is present, the file descriptor 102 is not associated with a communication channel.

In some operating systems 117, every file descriptor 102 is either associated with a file stored on media ("media file") or with a communication channel. In embodiments of the present invention that execute under such operating systems 117, the indicator table 127 can be utilized to determine whether or not any specific file descriptor 102 is associated with a communication channel, and whether or not any specific file descriptor 102 is associated with a media file. The indicator table 127 can be utilized to 20 determine whether or not a file descriptor 102 is associated with a communication channel, as described above. Because file descriptors 102 that are not associated with communication channels are associated with files stored on media, the indicator table 127 can also be utilized to determine whether or not a specific file descriptor 102 is associated with a media file. In order to so determine, the indicator table 127 is examined to determine if an indicator 205 concerning the specific file descriptor 102 is present. If not, the file descriptor 102 is associated with a media file. If such an indicator 205 is present, the file descriptor 102 is not associated with a media file.

III. Disambiguating File Descriptors Relating to Files Stored on Media

Figure 3:
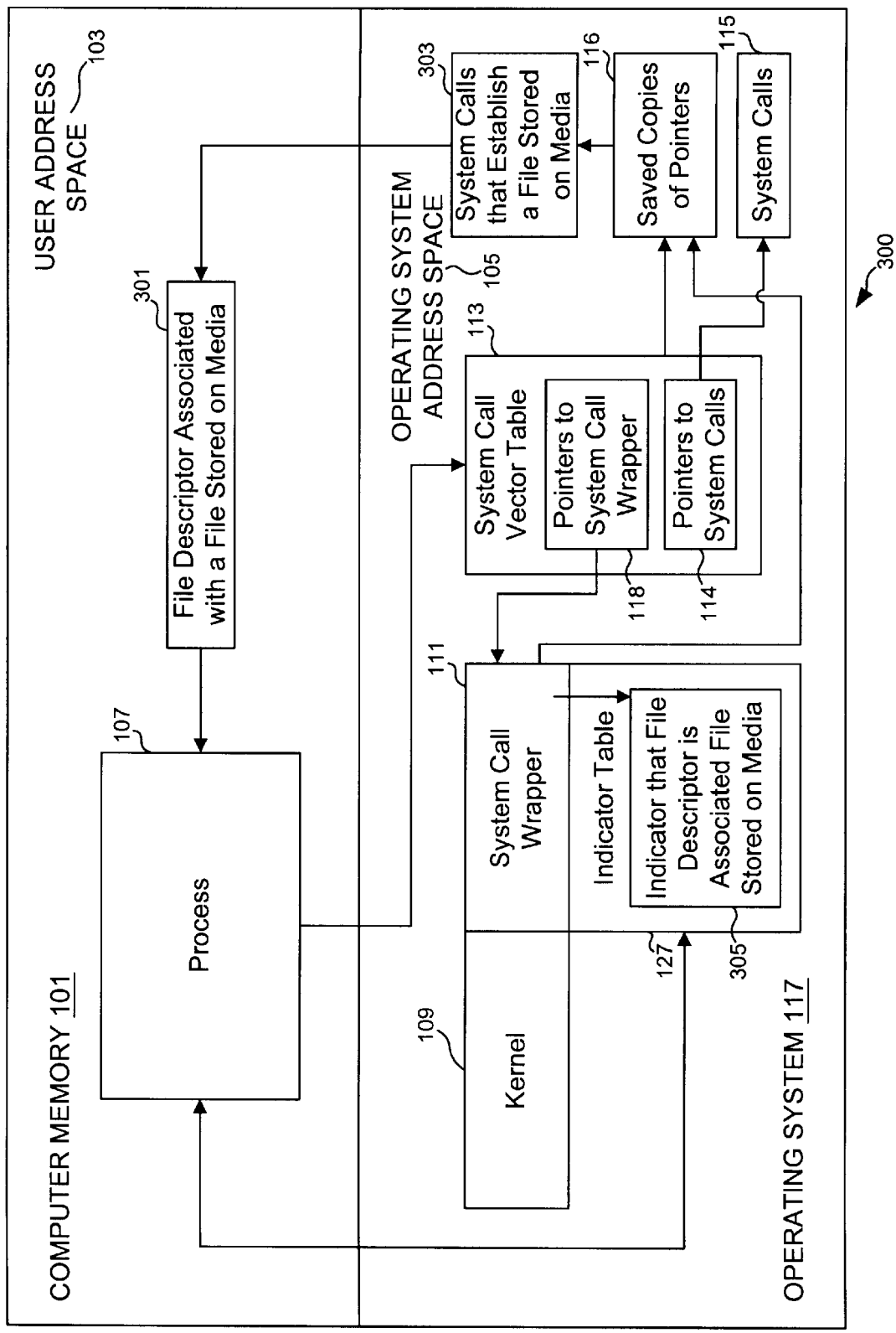
FIG. 3 is a block diagram illustrating a system for maintaining and utilizing an indicator table in order to disambiguate file descriptors that are associated with files stored on media from those that are not according to one embodiment of the present invention.

FIG. 3 illustrates a system 300 for maintaining and utilizing a table 127 of indicators 305 relating to file descriptors 301 of files stored on media in order to disambiguate file descriptors 301 that are associated with files stored on media from file descriptors 102 that are not, according to one embodiment of the present invention.

In the embodiment of FIG. 3, system calls 303 that establish a media file are intercepted. When a system call 303 that establishes a media file is made, the operating system 117 uses the pointer 118 in the system call vector table 113 to execute the system call wrapper 111. The system call wrapper 111 first utilizes the saved copy of the pointer 116 to the system call 303 to make the system call 303. The system call 303 20 executes, thereby establishing the media file. After having established the media file, the system call 303 returns a file descriptor 301 that is associated with the established media file. This file descriptor 301 is to be used by processes 107 in order to access the established media file.

After the system call 303 terminates, the system call wrapper 111 stores (in the indicator table 127) an indicator 305 that the file descriptor 301 returned by the system call 303 is associated with a media file. Thus, whenever a system call 303 that establishes a media file is made, the system call wrapper 111 executes and stores, in the indicator table 127, an indicator 305 that the file descriptor 301 is associated with a media file.

In order to keep the indicator table 127 complete, system calls 115 that create a copy of a file, a copy of a file descriptor 102, or a copy of an operating system file descriptor 102 table are also intercepted, as in the embodiment of FIG. 2. Additionally, in order to keep the indicator table 127 current, system calls 115 that delete a file descriptor 102 are intercepted, as in the embodiment of FIG. 2. Thus, system calls 115 that copy or delete file descriptors 102 are intercepted. If a file descriptor that is associated with a media file 301 is copied or deleted, the system call wrapper 111 updates the indicator table 127 appropriately. Therefore, the indicator table 127 preferably includes an indicator 305 for every existing file descriptor 301 that is associated with a media file.

Because the indicator table 127 includes an indicator 305 for file descriptors that are associated with files stored on media 301, the indicator table 127 can be utilized to determine whether or not a specific file descriptor 102 is associated with a media file. The indicator table 127 can be examined to determine if an indicator 305 concerning the specific file descriptor 102 is present. If so, the file descriptor 301 is associated with a media file. If no such indicator 305 is present, the filed descriptor 102 is not associated with a media file.

As described above, in some operating systems 117, every file descriptor 102 is either associated with a media file or with a communication channel. In embodiments of the present invention that execute under such operating systems 117, the indicator table 127 can be utilized to determine whether or not any specific file descriptor 102 is associated with a media file, and whether or not any specific file descriptor 102 is associated with a communication channel. The indicator table 127 can be utilized to determine whether or not a file descriptor 102 is associated with a media file, as described above. Because file descriptors 102 that are not associated with files stored on media are associated with communication channels, the indicator table 127 can also be utilized to determine whether or not a specific file descriptor 102 is associated with a communication channel. In order to so determine, the indicator table 127 is examined to determine if an indicator 305 concerning the specific file descriptor 102 is present. If not, the file descriptor 301 is associated with a communication channel. If such an indicator 305 is present, the file descriptor 102 is not associated with a communication channel.

It is to be understood that the present invention is not limited to utilizing indicators 205 concerning communication channel file descriptors 201 and indicators 305 concerning file descriptors associated with files stored on media 301 in order to disambiguate file descriptors 102. Other embodiments of the present invention utilize the above described steps to maintain indicator tables 127 including indicators concerning file descriptors 102 associated with other file types (for example, file descriptors 102 associated with hardware devices and file descriptors 102 associated with system resources). It is to be understood further that the term "file type" can be defined as broadly or narrowly as desired. Files that are stored on media are an example of a broad file type. Narrower file types include files stored on media in specific directories, files with a specific attribute such as read only, and even a specific file (a file type of one).

In these alternative embodiments, the respective indicator tables 127 are examined to determine whether or not specific file descriptors 102 are associated with specific file types. In other embodiments, an indicator table 127 including indicators 129 concerning multiple file types (or multiple indicator tables 127 each concerning one or more types) is (are) maintained and examined to disambiguate file descriptors 102. In some embodiments in which disambiguation concerns descriptors 102 of a narrow file type, when a system call 115 that establishes a file is intercepted, the system call wrapper 111 determines whether the established file is of the file type. For example, consider an embodiment in which file descriptors 102 that are associated with files stored on media in a specific directory are disambiguated from files descriptors that are associated with other files stored on media. All system calls that establish a media file 303 are intercepted. The system call wrapper 111 determines if the file being established is to be stored in the specific directory. Only if so does the system call wrapper 111 store an indicator 129 that the file descriptor 102 is associated with the file type. System calls 115 that copy and delete file descriptors are also intercepted, and the table 127 is updated appropriately as files are copied to and deleted from the specific subdirectory.

IV. Selectively Intercepting System Calls That Access Files of a Specific Type

Figure 4:
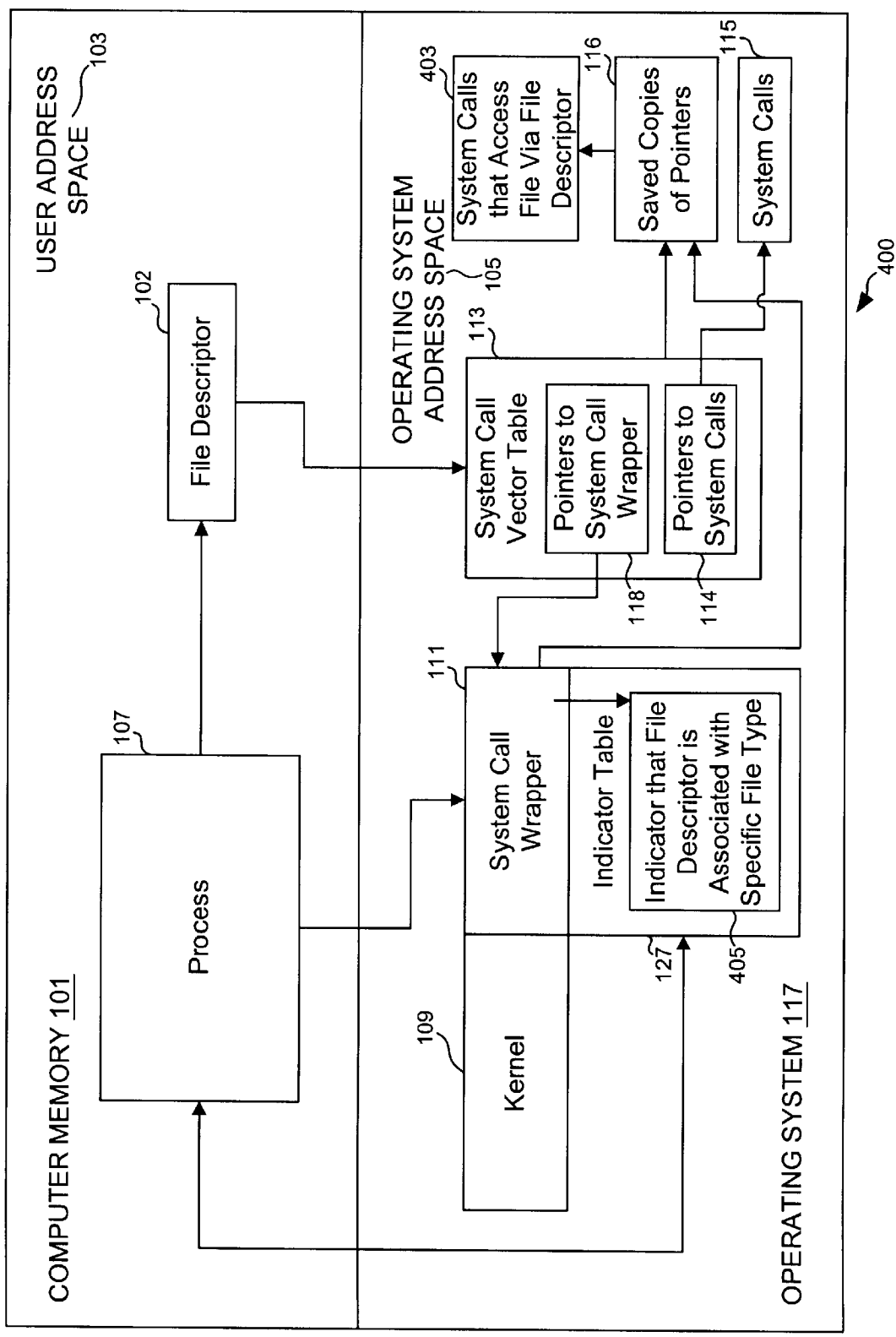
FIG. 4 is a block diagram illustrating a system for selectively intercepting system calls that access files of a specific type according to one embodiment of the present invention.

FIG. 4 illustrates a system 400 for using an indicator table 127 to selectively intercept system calls 115 that access files of a specific type, according to one embodiment of the present invention. An indicator table 127 including indicators 405 relating to file descriptors 102 associated with the specific file type is maintained. In one embodiment the file type identifies communication channels. In another embodiment the file type identifies files stored on media. In yet another embodiment, the file type identifies hardware devices. Still other embodiments include other file types as desired.

Regardless, system calls 115 that establish files of the specific file type are intercepted, and indicators 405 concerning file descriptors 102 associated with the specific file type are stored in the indicator table 127, in the manner described in the embodiment of FIG. 2 and in the embodiment of FIG. 3. In order to keep the indicator table 127 complete and current, system calls 115 that make a copy of a file descriptor 102 and that delete a file descriptor 102 are also intercepted in the manner described in the embodiment of FIG. 2 and in the embodiment of FIG. 3. Whenever a file descriptor 102 associated with the specific file type is copied or deleted, the indicator table is updated appropriately. Thus, the indicator table 127 preferably includes an indicator 405 for every file descriptor 102 associated with the specific file type.

The indicator table 127 is then used to facilitate selective interception of system calls 115 that access a file of the specific file type. System calls that access a file via a file descriptor 403 are intercepted. Examples of system calls that access a file via a file descriptor 403 are the UNIX® read ( ) and write ( ) functions. It is to be understood that the names of the system calls that access a file via a file descriptor 403 may vary from operating system 117 to operating system 117. The present invention is not limited to any specific operating system 117, or to any specific system call name.

To prepare to intercept system calls that access a file via a file descriptor 403, a copy 116 is made of internal operating system pointers 114 in the system call vector table 113 to such system calls 403. The pointers 114 in the system call vector table 113 to system calls 403 that access a file via a file descriptor are replaced with pointers 118 to the system call wrapper 111, such that when the system calls 403 are made, the system call wrapper 111 is executed instead.

When a system call 403 that accesses a file via a file descriptor is made, the operating system 117 uses the pointer 118 in the system call vector table 113 to execute the system call wrapper 111. The system call wrapper 111 examines the indicator table 127 to determine whether or not the file descriptor 102 is associated with the specific file type. If the file descriptor 102 is associated with the specific file type, the system call wrapper 111 continues to execute. If the file descriptor 102 is not associated with the specific file type, the system call 115 utilizes the saved copy of the pointer 116 to the system call 403 to make the system call 403, such that when the system call 403 finishes executing, execution control returns to the calling process 107.

Thus, system calls 403 that access a file via a file descriptor are selectively intercepted based on the file type. For example, suppose it is desirable only to intercept system calls 203 that access communication channels, but not to intercept system calls 303 that access files stored on media. When a system call 403 that accesses a file via a file descriptor is made (for example, a call to the read ( ) function), the system call wrapper 111 executes and examines the indicator table 127 to determine whether the file descriptor 102 that the system call 403 is attempting to access is associated with a communication channel. If so, the system call wrapper 111 proceeds to execute as desired. If the file descriptor 102 is not associated with a communication channel, the system call wrapper 111 makes the system call 115, such that execution control is returned to the calling process after the system call 115 terminates. Of course, the present invention can also be used to selectively intercept system calls that access files stored on media, as well as any other specific file type.

In summary, one aspect of the present invention facilitates the disambiguation of file descriptors associated with any file type. Such disambiguation of file descriptors allows the selective interception of system calls that access files of any specific file type via a file descriptor.

V. Intercepting I/O Multiplexing Operations

Another aspect of the invention relates to intercepting I/O multiplexing operations involving cross-domain (e.g., mixed type) file descriptor sets. Certain system calls, such as I/O multiplexing functions, may operate on sets of file descriptors of mixed file types, e.g., communication channels and files stored on media. For example, the UNIX® select ( ) and poll ( ) functions allow a process to instruct the kernel to wait for any one of a set of file descriptors to become ready for I/O. An I/O multiplexing operation returns a set of file descriptors ready for I/O, including an indication of whether the file descriptor is ready for reading, ready for writing, or whether an error condition exists.

As previously described, communication channels and files stored on media are inherently different, despite the fact that both are accessed via file descriptors. Thus, it is often desirable to intercept system calls that access a media file, but not to intercept system calls that access a communication channel, and vice versa. However, in the context of an I/O multiplexing operation, a single system call (e.g., select or poll) operates on a mixed set of file descriptors.

In many cases, it would be desirable to intercept the processing of certain types of file descriptors within a single I/O multiplexing operation, while permitting other file descriptors to be handled in the usual manner. However, such selective interception of functionality within a single system call presents even more difficulties than the above-described techniques for disambiguating file descriptors for selectively intercepting system calls such as the UNIX® read ( ) and write ( ) functions.

Figure 5:
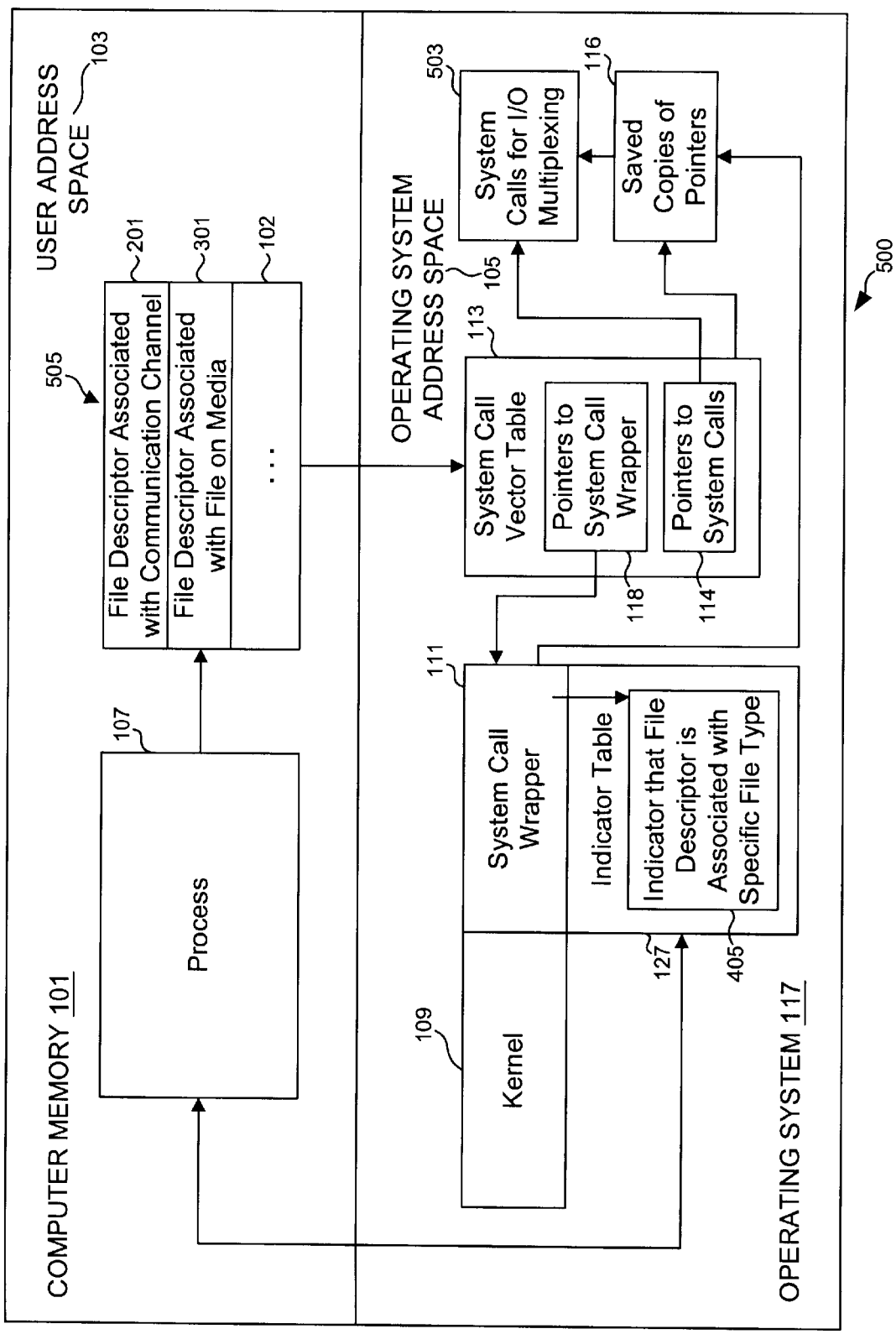
FIG. 5 is a block diagram illustrating a system for intercepting I/O multiplexing operations involving cross-domain file descriptor sets according to one embodiment of the present invention.

FIG. 5 illustrates a system 500 for intercepting I/O multiplexing system calls 503 involving cross-domain file descriptor sets 505. System calls 503 for performing I/O multiplexing operations are intercepted using the techniques discussed above with reference to FIG. 4. For example, pointers 114 to the I/O multiplexing system calls 503 are saved (as copies 116) and then replaced with pointers 118 to the system call wrapper 111. Thus, when an I/O multiplexing system call 503 is made by a process 107, the system call wrapper 111 is executed instead.

As shown in FIG. 5, a cross-domain set 505 may include file descriptors 201, 301 corresponding to communication channels and files stored on media, respectively. Of course, the file descriptor set 505 may include file descriptors of various other types, such as hardware devices and the like.

Figure 6:
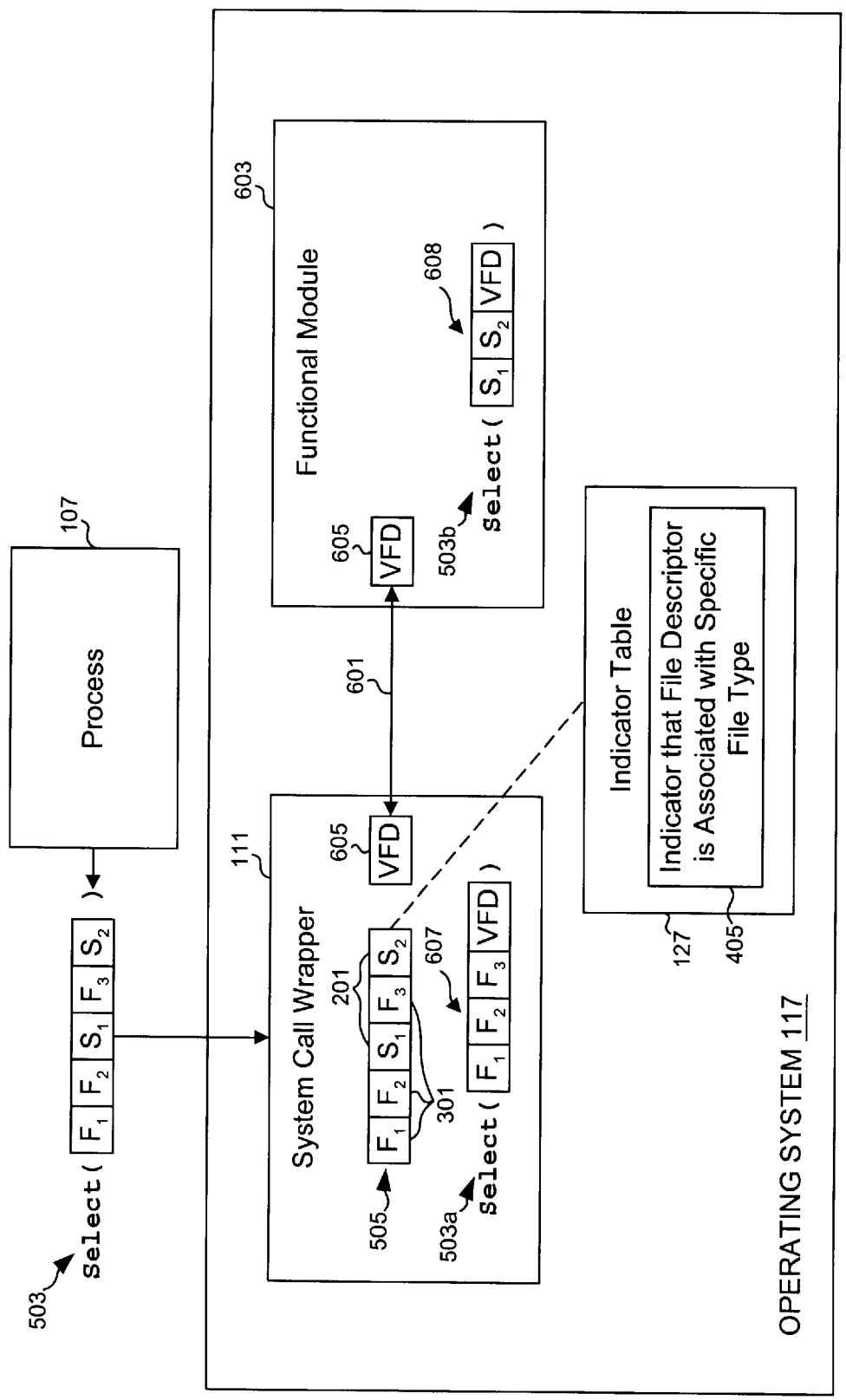
FIG. 6 is a block diagram illustrating interactions between a system call wrapper, a functional module, and an indicator table according to one embodiment of the present invention.

As shown in FIG. 6, the system call wrapper 111 receives the file descriptor set 505 specified in the intercepted I/O multiplexing call 503. For ease of illustration, file descriptors 201 relating to communication channels are identified by the letter "S," while file descriptors 301 relating to files stored on media are designated by the letter "F." However, those skilled in the art will recognize that the present invention is not limited to these specific file types.

In one embodiment, the system call wrapper 111 establishes a private connection 601 with a functional module 603. The use and operation of the functional module 603 is described in greater detail below. It should be noted, however, that the functional module 603 comprises a different process or thread of execution than the wrapper 111 in one implementation. Thus, executing an I/O multiplexing call 503 by the wrapper 111 will not prevent execution of a parallel call 503 by the functional module 603.

The private connection 601 may comprise a standard communication channel, which is identified in both the wrapper 111 and the functional module 603 by the same file descriptor, referred to herein as a "virtual" file descriptor 605 (or simply "VFD"). In the following disclosure, the term "virtual file descriptor" means that the associated file descriptor 605 is used in the context of the private connection 601. Techniques for establishing connections 601 between processes based on file descriptors are well known in the art.

In one implementation, the system call wrapper 111 disambiguates the file descriptors 201, 301 in the set 505 according to file type by referencing the indicator table 127. As described above, the indicator table 127 may include an indicator 405 of the file type associated with each file descriptor. In an alternative embodiment, as shown in FIGS. 2 and 3, the table 127 may store indicators 205, 305 corresponding to one particular file type, e.g., communication channels or files stored on media. In such an embodiment, a lack of an indicator in the table 127 with respect to one type may be an indication that a file descriptor corresponds to the other type.

After the file descriptors 201, 301 are disambiguated, the system call wrapper 111 divides the set 505 into first and second subsets 607, 608 according to the disambiguated file types. For example, in the cross-domain set 505 of FIG. 6, the file descriptors 301 relating to files stored on media (e.g., $F_1$, $F_2$, and $F_3$) are assigned to the first subset 607, while the file descriptors 201 relating to communication channels (e.g., $S_1$ and $S_2$) are assigned the second subset 608. Of course, the assignments may be reversed in alternative embodiments.

In one implementation, the system call wrapper 111 adds the virtual file descriptor 605 used in the private connection 601 to both of the subsets 607, 608. Thus, as shown in FIG. 6, the first subset 607 corresponding to files stored on media is augmented by the virtual file descriptor 605, as well as the second subset 608 corresponding to communication channels. The wrapper 111 may then send the subset 608 to the functional module 603 via the connection 601, although the invention is not limited in this respect.

After the subsets 607, 608 are modified, the wrapper 111 and the functional module 603 initiate system calls 503 in parallel for performing separate I/O multiplexing operations using the first and second subsets 607, 608 of file descriptors, respectively. The default (unintercepted) system calls 503 may be accessed via the saved copies 116 of the pointers 114 thereto (as shown in FIG. 5). Of course, either the wrapper 111 or the functional module 603 may implement a custom "select" call, as described in greater detail below, in order to permit special handling of one of the file types. Likewise, either the wrapper 111 or the functional module 603 may include special code for processing the file descriptors prior to initiating the parallel system calls.

As shown in FIG. 6, the wrapper 111 may initiate a UNIX® select ( ) system call 503a using the first subset 607 of file descriptors 301 (augmented by the VFD 605). Likewise, the functional module 603 may initiate a parallel system call 503b using the second subset 608 of file descriptors 201 (augmented by the VFD 605). In UNIX®, an I/O multiplexing call 503 may specify multiple file descriptor sets 505 in order to separately test for read, write, and exception conditions. For simplicity, however, this discussion will assume that an I/O multiplexing call 503 specifies a single file descriptor set 505 and returns when any of the associated file descriptors are ready for I/O (or an error is detected).

As noted above, I/O multiplexing calls 503 typically block until one or more of the file descriptors in the specified set (e.g., subset 607 or 608) are ready for I/O. Normally, this puts the calling process (e.g., wrapper 111 or functional module 603) to sleep until at least one corresponding file descriptor is ready.

In general, one of the system calls 503a–b will return first in response to one or more of its associated file descriptors becoming ready for I/O. When this occurs, the associated process (e.g., wrapper 111 or functional module 603) writes to or reads from the connection 601 identified by the VFD 605. This automatically unblocks the other system call 503a–b, since the VFD 605 is included in both subsets 607, 608. Thus, both system calls 503a–b return if either one returns.

Thereafter, the results of the system calls 503a–b (e.g., file descriptors ready for I/O other than the VFD 605) may be combined by the system call wrapper 111 and returned to the calling process 107. In one embodiment, the results of the system call 503b associated with the functional module 603 are sent to the system call wrapper 111 via the private connection 601, however the invention is not limited in this respect.

Figure 7:
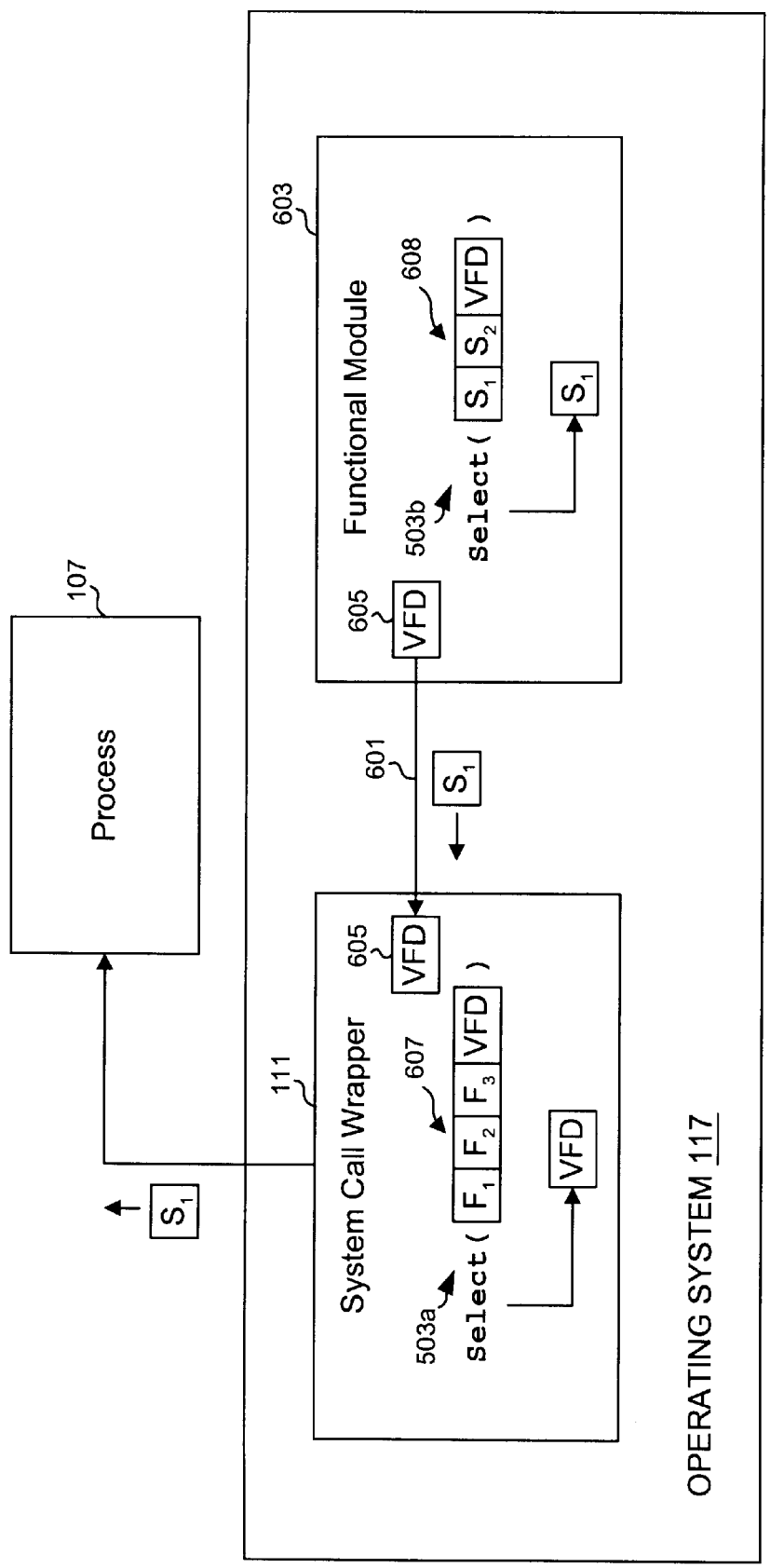
FIG. 7 is a block diagram illustrating interactions between a system call wrapper and a functional module according to one embodiment of the present invention.

For example, as shown in FIG. 7, the system call 503b associated with functional module 603 may return first, indicating that the file descriptor $S_1$ is ready for I/O. However, the system call 503a remains blocked. In one embodiment, the functional module 603 unblocks the system call 503a by writing, for example, to the connection 601 identified by the VFD 605.

In one implementation, the functional module 603 sends the results of the system call 503b, e.g. file descriptor $S_1$, to the system call wrapper 111 via the connection 601. The wrapper 111 then returns the same to the calling process 107 (since the system call 503a did not identify any file descriptors ready for I/O other than the VFD 605).

Figure 8:
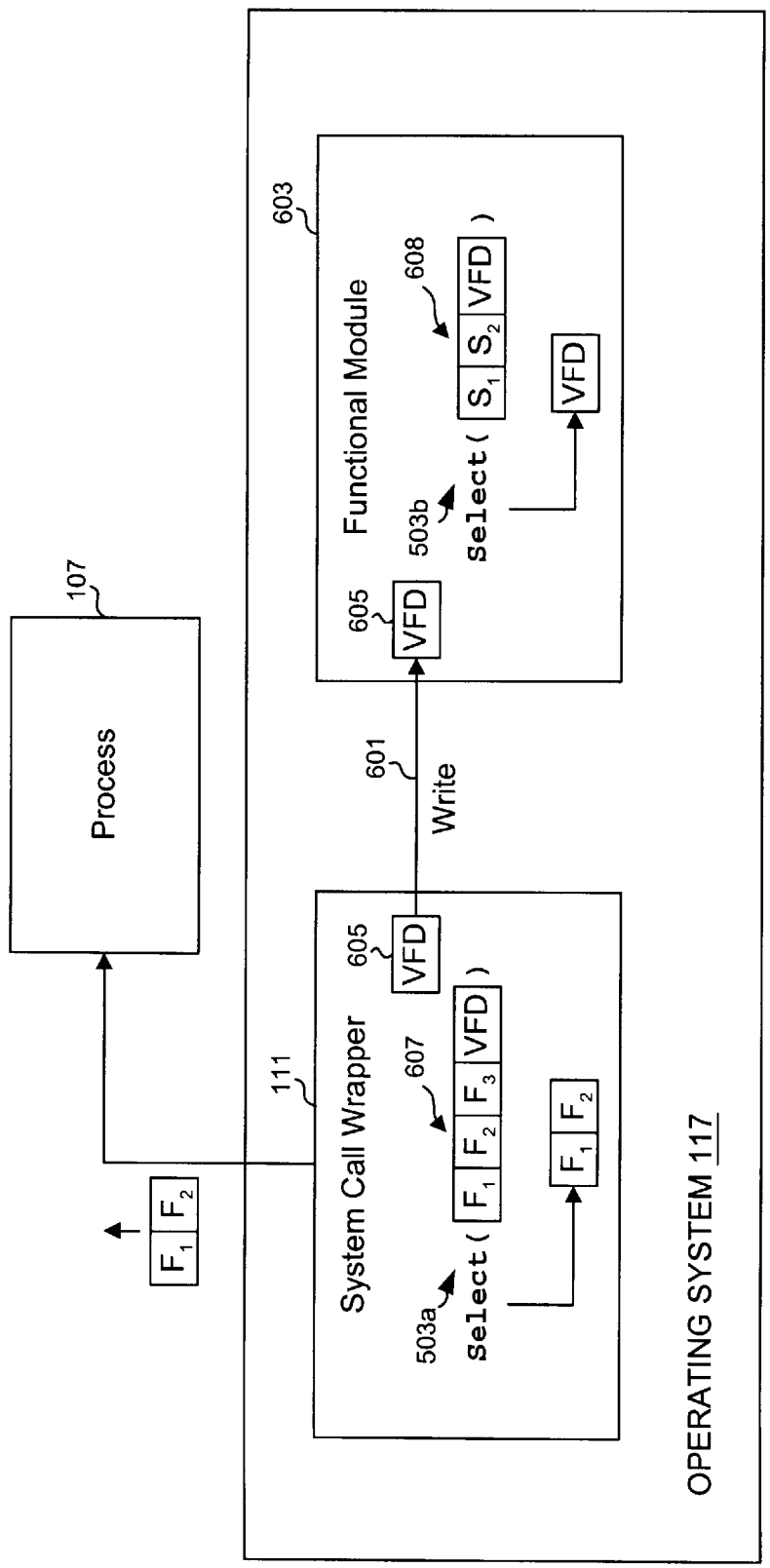
FIG. 8 is a block diagram illustrating interactions between a system call wrapper and a functional module according to one embodiment of the present invention.

Alternatively, as shown in FIG. 8, the system call 503a associated with system call wrapper 111 returns first, indicating that the file descriptors $F_1$ and $F_2$ are ready for I/O. However, the system call 503b remains blocked. In one embodiment, the system call wrapper 111 unblocks the system call 503b by writing, for example, to the connection 601 identified by the VFD 605.

Since the system call 503b associated with the functional module 603 did not identify any file descriptors (other than the VFD 605) ready for I/O, the wrapper 111 may simply return the results of the system call 503a, e.g., file descriptors $F_1$ and $F_2$, to the calling process 107.

Figure 9:
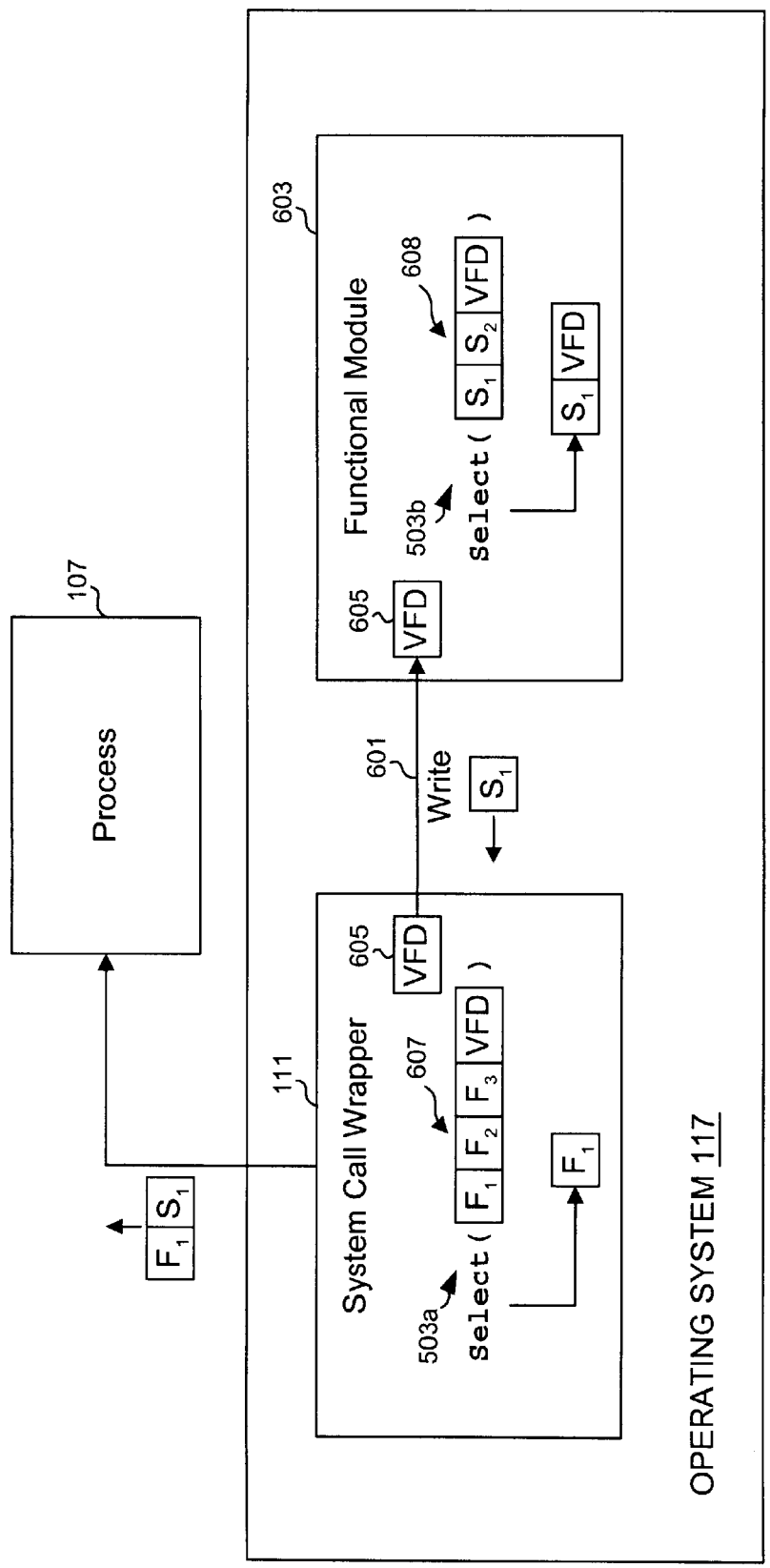
FIG. 9 is a block diagram illustrating interactions between a system call wrapper and a functional module according to one embodiment of the present invention.

As shown in FIG. 9, sometimes both of the system calls 503a–b return file descriptors ready for I/O other than the VFD 605. This may occur when file descriptors associated with the system calls 503a–b become ready at essentially at the same time, or when a file descriptor becomes ready for I/O between the time the first system call returns and the last system call is unblocked.

As noted, in one embodiment, the system call wrapper 111, in such a case, combines the results of the system calls 503a–b. Thus, as shown in FIG. 9, the functional module 603 sends send the results of the system call 503b (other than the VFD 605) to the wrapper 111, e.g. $S_1$. Thereafter, the system call wrapper 111 combines the results of the system calls 503a–b, e.g., $F_1$ and $S_1$, and returns the same to the calling process 107.

Figure 10:
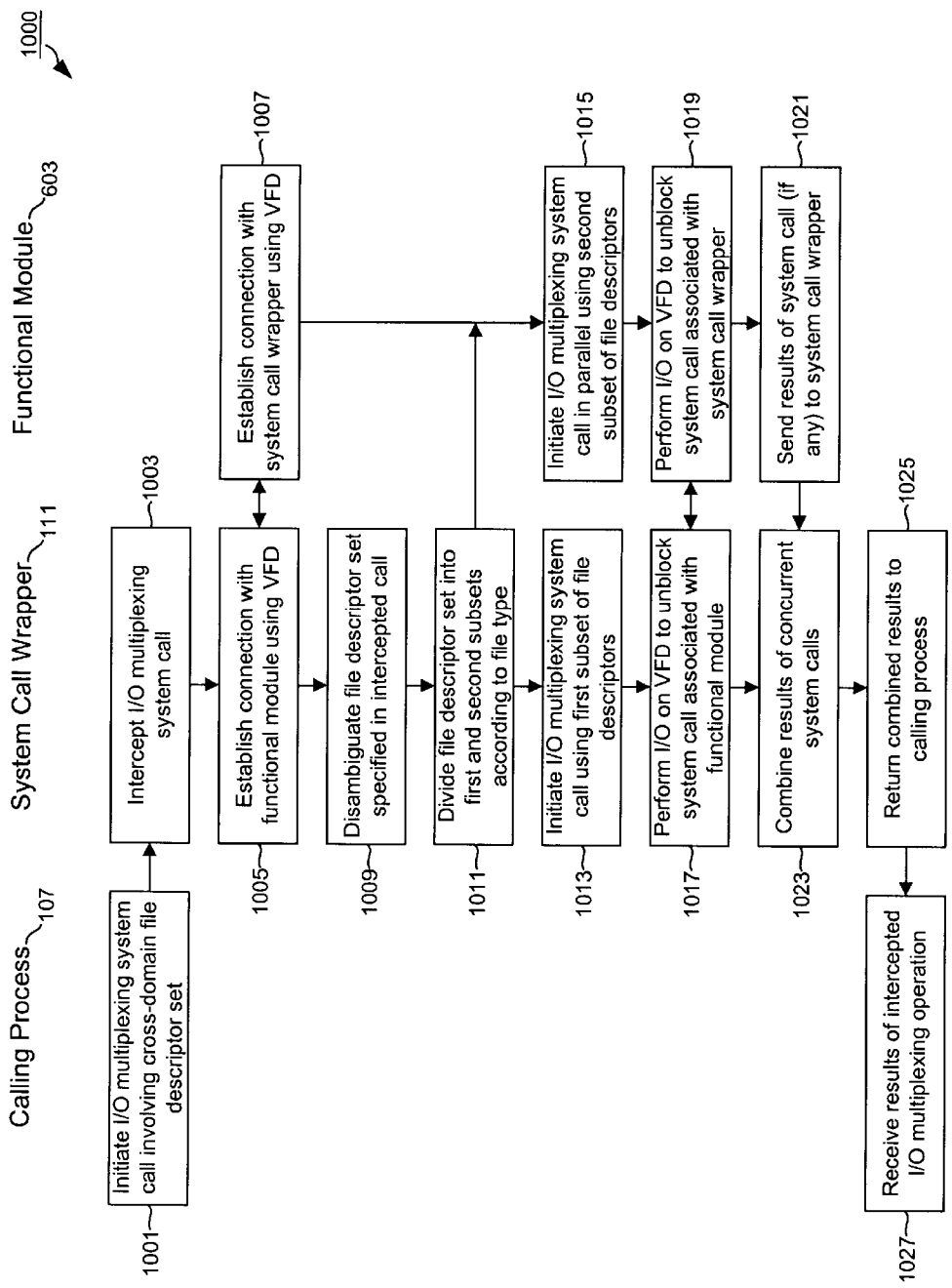
FIG. 10 is a flowchart of a method for intercepting I/O multiplexing operations involving cross-domain file descriptor sets according to one embodiment of the present invention.

The above-described process for intercepting I/O multiplexing operations may be summarized in FIG. 10. A method 1000 begins within a calling process 107 by initiating 1001 an I/O multiplexing system call 503 involving a cross-domain file descriptor set 505. A system call wrapper 111 intercepts 1003 the system call 503 as illustrated in FIG. 5.

In one implementation, the system call wrapper 111 establishes 1005 a private connection 601 with a functional module 111 using a VFD 605. Correspondingly, the functional module 111 establishes 1007 a connection 601 with the wrapper 111, also using the VFD 605.

The system call wrapper 111 then disambiguates 1009 the file descriptor set 505 specified in the intercepted system call 503. In other words, the wrapper 111 determines the file type associated with each file descriptor in the set 505. As shown in FIG. 6, this is accomplished in one embodiment with reference to the indicator table 127. Thereafter, the wrapper 111 divides 1011 the set 505 into first and second subsets 607, 608 according to the disambiguated file types. In one embodiment, the wrapper 111 sends the second subset 608 of file descriptors to the functional module 603 via the connection 601.

Next, the system call wrapper 111 initiates 1013 an I/O multiplexing system call 503a using the first subset 607 of file descriptors. In parallel, the functional module 603 initiates 1015 a separate I/O multiplexing system call 503b using the second subset 608 of file descriptors.

When the system call 503a returns, the system call wrapper 111 performs 1017 an I/O operation (e.g, read or write) on the connection 601 identified by the VFD 605, unblocking the system call 503b (if it still remains blocked). Likewise, when the system call 503b returns, the functional module 603 performs 1019 an I/O operation (e.g., read or write) on the communication channel 601 identified by the VFD 605, unblocking the system call 503a (if it still remains blocked).

Thereafter, the functional module 603 sends 1021 any results of the system call 20 503b (e.g., file descriptors ready for I/O other than the VFD 605) to the system call wrapper 111. The wrapper 111 then combines 1023 the results of the parallel system calls 503a–b, returning 1025 the combined results to the calling process 107, which receives 1027 the same.

In one embodiment, a feature of the above-described method 1000 is that file descriptors of a particular type may receive special handling within the context of an I/O multiplexing call 503. For example, in certain embodiments, files relating to communication channels may be virtualized, requiring conversion between virtual and actual network addresses and the like. Initiating separate system calls 503a–b by the wrapper 111 and the functional module 603, respectively, allows communication channels to be treated differently than files stored on media.

Figure 11:
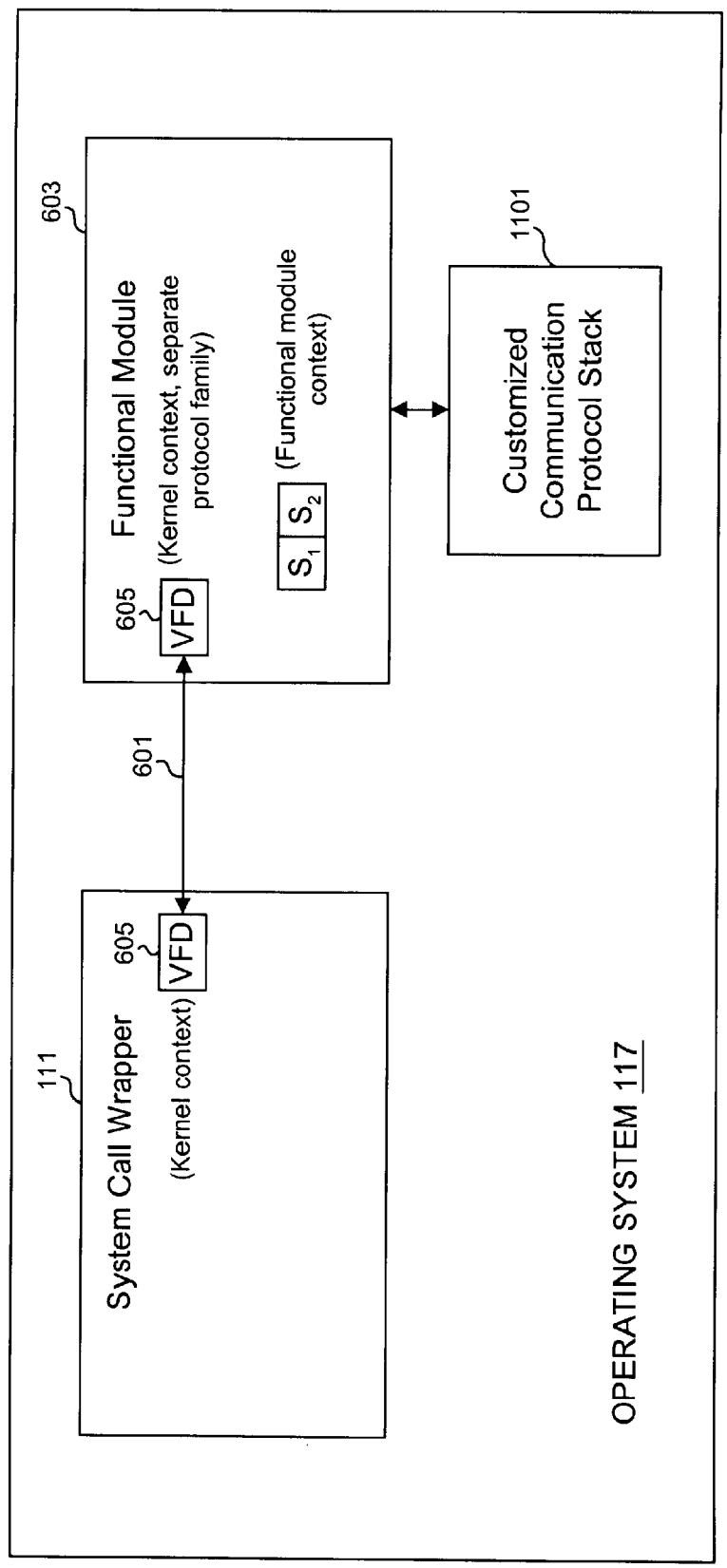
FIG. 11 is an illustration of a system call wrapper, a functional module, and a customized communication protocol stack according to one embodiment of the present invention.

One way in which file descriptors can be handled differently is by associating the functional module 603 with a customized communication protocol stack 1101, as shown in FIG. 11. While the functional module 603 is used in one embodiment, those skilled in the art will recognize that the system call wrapper 111 may also be used for the same purpose.

As used herein, the term "communication protocol stack" denotes layers of software (e.g., application layer, transport layer, network layer, and datalink layer) that facilitate inter-computer and inter-process communication according to a specific protocol. An example of a communication protocol stack 1101 is the Transmission Control Protocol/IP Protocol (TCP/IP) stack, which is well known to those skilled in the art.

A customized communication protocol stack 1101 provides significant control over how file descriptors are handled. For example, file descriptors used by the functional module 603 may only have meaning within the context of the functional module 603. As shown in FIG. 11, a file descriptor $S_1$ may be associated with a communication channel in the functional module context, but not be assigned in the context of the operating system kernel 109. File descriptors may be handled by the customized stack 1101 in any desired manner, allowing, for example, communication channels or other types of files to be virtualized.

If file descriptors in the functional module 603 are in a separate context, the virtual file descriptor (VFD) 605 should correspond to the kernel context in order to facilitate the private connection 601 with the system call wrapper 111. To accomplish this, the VFD 605 may be associated with a different protocol family. For example, if a customized protocol stack 1101 implements the protocol family "AF_INET" in the functional module context, a different protocol family may be provided for the VFD 605 in order to operate in the kernel context.

Of course, many other techniques exist for special processing of various types of file descriptors. For example, additional code may be provided in the functional module 603 for translations or other types of operations on file descriptors. Likewise, either the system call wrapper 111 or the functional module 603 may implement its own, customized I/O multiplexing system call 503.

Based on the foregoing, the present invention provides techniques for disambiguating file descriptors in order to facilitate selective interception of various system calls. Certain system calls, such as I/O multiplexing functions, operate on multiple file descriptors, some of which may correspond to different file types. Accordingly, the present invention provides techniques for selective interception of the processing of certain types of file descriptors within a single I/O multiplexing system call, such as a UNIX® select ( ) or poll ( ) function. By initiating parallel system calls 503 by a system call wrapper 111 and a functional module 603, one or more types of file descriptors may be processed in non-standard ways, despite the fact that a single I/O multiplexing call 503 is intercepted.

As will be understood by those familiar with the art, the invention may be embodied in other specific forms without departing from the spirit or essential characteristics thereof. Likewise, the particular naming of the modules, features, attributes or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

We claim:

1. A method in a computer system for executing I/O multiplexing operations comprising:

intercepting a system call for performing an I/O multiplexing operation on a set of file descriptors;

initiating system calls in parallel for performing separate I/O multiplexing operations on a first subset and a second subset of the set of file descriptors;

in response to one of the parallel system calls identifying at least one file descriptor ready for communication, unblocking the other parallel system call; and returning to a calling process an indication of the at least one file descriptor.

2. The method of claim 1, wherein initiating system calls comprises:

dividing the set of file descriptors into a first subset corresponding to a first file type and a second subset corresponding to a second file type.

3. The method of claim 2, wherein one of the file types identifies a communication channel.

4. The method of claim 3, wherein one of the file types identifies a file stored on media.

5. The method of claim 4, wherein one of the file types identifies a hardware device.

6. The method of claim 1, wherein intercepting a system call comprises:

loading a system call wrapper into an operating system;

saving a pointer to the system call; and replacing the pointer to the system call with a pointer to the system call wrapper.

7. The method of claim 6, wherein the pointer to the system call comprises an interrupt vector.

8. The method of claim 1, wherein dividing the set of file descriptors comprises:

disambiguating the set of file descriptors according to file type.

9. The method of claim 8, wherein an association data structure stores associations between file descriptors and file types, and wherein disambiguating the set of file descriptors comprises:

identifying, for each file descriptor, a file type from an association therewith in the association data structure.

10. The method of claim 8, wherein disambiguating the set of file descriptors comprises:

intercepting system calls that establish a file descriptor; and storing an association between an established file descriptor and a file type.

11. The method of claim 1, wherein initiating system calls comprises:

executing a first system call using a first process, the first system call for initiating an I/O multiplexing operation on the first subset of file descriptors; and executing a second system call using a second process, the second system call for initiating an I/O multiplexing operation on the second subset of file descriptors.

12. The method of claim 11, wherein initiating system calls further comprises:

establishing a connection between the first and second processes.

13. The method of claim 12, wherein establishing a connection comprises:

opening a communication channel between the first and second processes, the communication channel identified by a virtual file descriptor.

14. The method of claim 13, wherein initiating system calls further comprises:

adding the virtual file descriptor to the first and second subsets of file descriptors.

15. The method of claim 14, wherein unblocking the other parallel system call comprises:

performing a read operation using the virtual file descriptor.

16. The method of claim 14, wherein unblocking the other parallel system call comprises:

performing a write operation using the virtual file descriptor.

17. The method of claim 1, wherein returning to a calling process comprises:

returning to a calling process an indication of at least one file descriptor identified by the other parallel system call as ready for communication.

18. An method in a computer system for executing I/O multiplexing operations comprising:

intercepting a system call by a system call wrapper, the system call for performing an I/O multiplexing operation on a set of file descriptors;

establishing a connection between the system call wrapper and a functional module;

dividing the set of file descriptors into a first subset corresponding to a first file type and a second subset corresponding to a second file type;

initiating a first system call by the system call wrapper for performing an I/O multiplexing operation on the first subset of file descriptors;

initiating in parallel a second system call by the functional module for performing an I/O multiplexing operation on the second subset of file descriptors;

combining sets of file descriptors identified by the first and second system calls as ready for communication into a third subset; and returning to a calling process the third subset of file descriptors.

19. The method of claim 18, further comprising:

in response to the first system call identifying at least one file descriptor ready for communication, unblocking the second system call.

20. The method of claim 19, wherein unblocking the second system call comprises:

performing an I/O operation via the connection.

21. A computer program product for executing I/O multiplexing operations comprising:

program code for intercepting a system call for performing an I/O multiplexing operation on a set of file descriptors;

program code for initiating system calls in parallel for performing separate I/O multiplexing operations on a first subset and a second subset of the set of file descriptors;

program code for, in response to one of the parallel system calls identifying at least one file descriptor ready for communication, unblocking the other parallel system call; and program code for returning to a calling process an indication of the at least one file descriptor.

22. The computer program product of claim 21, wherein program code for initiating system calls comprises:

program code for dividing the set of file descriptors into a first subset corresponding to a first file type and a second subset corresponding to a second file type.

23. The computer program product of claim 22, wherein one of the file types identifies a communication channel.

24. The computer program product of claim 23, wherein one of the file types identifies a file stored on media.

25. The computer program product of claim 24, wherein one of the file types identifies a hardware device.

26. The computer program product of claim 21, wherein program code for intercepting a system call comprises:

program code for loading a system call wrapper into an operating system;

program code for saving a pointer to the system call; and program code for replacing the pointer to the system call with a pointer to the system call wrapper.

27. The computer program product of claim 26, wherein the pointer to the system call comprises an interrupt vector.

28. The computer program product of claim 21, wherein program code for dividing the set of file descriptors comprises:

program code for disambiguating the set of file descriptors according to file type.

29. The computer program product of claim 28, wherein an association data structure stores associations between file descriptors and file types, and wherein program code for disambiguating the set of file descriptors comprises:

program code for identifying, for each file descriptor, a file type from an association therewith in the association data structure.

30. The computer program product of claim 28, wherein program code for disambiguating the set of file descriptors comprises:

program code for intercepting system calls that establish a file descriptor; and program code for storing an association between an established file descriptor and a file type.

31. The computer program product of claim 21, wherein program code for initiating system calls comprises:

program code for executing a first system call using a first process, the first system call for initiating an I/O multiplexing operation on the first subset of file descriptors; and program code for executing a second system call using a second process, the second system call for initiating an I/O multiplexing operation on the second subset of file descriptors.

32. The computer program product of claim 31, wherein program code for initiating system calls further comprises:

program code for establishing a connection between the first and second processes.

33. The computer program product of claim 32, wherein program code for establishing a connection comprises:

program code for opening a communication channel between the first and second processes, the communication channel identified by a virtual file descriptor.

34. The computer program product of claim 33, wherein program code for initiating system calls further comprises:

program code for adding the virtual file descriptor to the first and second subsets of file descriptors.

35. The computer program product of claim 34, wherein program code for unblocking the other parallel system call comprises:

program code for performing a read operation using the virtual file descriptor.

36. The computer program product of claim 34, wherein program code for unblocking the other parallel system call comprises:

program code for performing a write operation using the virtual file descriptor.

37. The computer program product of claim 21, wherein program code for returning to a calling process comprises:

program code for returning to a calling process an indication of at least one file descriptor identified by the other parallel system call as ready for communication.

38. An computer program product for executing I/O multiplexing operations comprising:

program code for intercepting a system call by a system call wrapper, the system call for performing an I/O multiplexing operation on a set of file descriptors;

program code for establishing a connection between the system call wrapper and a functional module;

program code for dividing the set of file descriptors into a first subset corresponding to a first file type and a second subset corresponding to a second file type;

program code for initiating a first system call by the system call wrapper for performing an I/O multiplexing operation on the first subset of file descriptors;

program code for initiating in parallel a second system call by the functional module for performing an I/O multiplexing operation on the second subset of file descriptors;

program code for combining sets of file descriptors identified by the first and second system calls as ready for communication into a third subset; and program code for returning to a calling process the third subset of file descriptors.

39. The computer program product of claim 38, further comprising:

program code for, in response to the first system call identifying at least one file descriptor ready for communication, unblocking the second system call.

40. The computer program product of claim 39, wherein program code for unblocking the second system call comprises:

program code for performing an I/O operation via the connection.

41. A system for executing I/O multiplexing operations comprising:

a system call wrapper configured to intercept a system call for performing an I/O multiplexing operation on a set of file descriptors and to initiate a first system call for performing an I/O multiplexing operation on a first subset of the set of file descriptors; and a functional module, in communication with the system call wrapper, configured to initiate in parallel a second system call for performing a separate I/O multiplexing operation on a second subset of the set of file descriptors.

42. The system of claim 41, wherein at least one of the file types is selected from the group consisting of a file stored on media, a communication channel, and a hardware device.

43. The system of claim 41, wherein the system call wrapper and the functional module comprise separate processes.

44. The system of claim 41, wherein a private connection links the system call wrapper and the functional module, the private connection being identified by a virtual file descriptor.

45. The system of claim 44, wherein the first and second subsets of file descriptors include the virtual file descriptor.

* * * * *

UNITED STATES PATENT AND TRADEMARK OFFICE
CERTIFICATE OF CORRECTION

PATENT NO.    : 6,732,211 B1
DATED         : May 4, 2004
INVENTOR(S)   : Pawan Goyal et al.

It is certified that error appears in the above-identified patent and that said Letters Patent is hereby corrected as shown below:

<u>Title page,</u>
Item [56], References Cited, U.S. PATENT DOCUMENTS, insert the following cited references:

| | | | |
|---|---|---|---|
| -- | US-5,640,595 | 06-17-1997 | Baugher et al. |
| | US-5,719,854 | 02-17-1998 | Choudhury et al. |
| | US-5,799,173 | 08-25-1998 | Gossler et al. |
| | US-5,905,859 | 05-18-1999 | Holloway, et al. |
| | US-5,915,095 | 06-22-1999 | Miskowiec |
| | US-5,920,699 | 07-06-1999 | Bare |
| | US-5,933,603 | 08-03-1999 | Vahalia, et al. |
| | US-5,978,373 | 11-02-1999 | Hoff et al. |
| | US-5,987,524 | 11-16-1999 | Yoshida et al. |
| | US-5,999,963 | 12-07-1999 | Bruno et al. |
| | US-6,038,608 | 03-14-2000 | Katsumanta |
| | US-6,038,609 | 03-14-2000 | Geulen |
| | US-6,055,617 | 04-25-2000 | Kingsbury |
| | US-6,092,178 | 07-18-2000 | Jindal et al. |
| | US-6,094,674 | 07-25-2000 | Hattori, et al. |
| | US-6,108,701 | 08-22-2000 | Davis et al. |
| | US-6,154,776 | 11-28-2000 | Martin |
| | US-6,154,778 | 11-28-2000 | Koistinen et al. |
| | US-6,172,981 | 01-09-2001 | Cox et al. |
| | US-6,230,203 | 05-08-2001 | Koperda et al. |
| | US-6,240,463 | 05-29-2001 | Benmohamed et al. |
| | US-6,247,057 | 06-12-2001 | Barrera |
| | US-6,279,039 | 08-21-2001 | Bhat et al. |
| | US-6,279,040 | 08-21-2001 | Ma et al. |
| | US-6,282,703 | 08-28-2001 | Meth et al. |
| | US-6,286,047 | 09-04-2001 | Ramanathan et al. |
| | US-6,314,558 | 11-06-2001 | Angel et al. |
| | US-6,327,622 | 12-04-2001 | Jindal et al. |
| | US-6,336,138 | 01-01-2002 | Caswell et al. |
| | US-6,351,776 | 02-26-2002 | Yu |
| | US-6,353,616 | 03-05-2002 | Elwalid et al. |
| | US-6,363,053 | 03-26-2002 | Schuster et al. |
| | US-6,385,638 | 05-07-2002 | Baker-Harvey |
| | US-6,393,484 | 05-21-2002 | Massarani |
| | US-6,434,631 | 08-13-2002 | Bruno et al. |
| | US-6,487,578 | 11-29-2002 | Ranganathan |
| | US-6,499,137 | 12-24-2002 | Hunt |
| | US-6,529,950 | 03-04-2003 | Lumelsky et al. |
| | US-6,553,413 | 04-22-2003 | Leighton et al. -- |

UNITED STATES PATENT AND TRADEMARK OFFICE
CERTIFICATE OF CORRECTION

PATENT NO. : 6,732,211 B1
DATED : May 4, 2004
INVENTOR(S) : Pawan Goyal et al.

It is certified that error appears in the above-identified patent and that said Letters Patent is hereby corrected as shown below:

<u>Title page (cont'd),</u>
OTHER PUBLICATIONS, insert the following:
-- Symbol Table, [online] copyright 1997, [Retrieved on April 4, 2003] Retrieved from the internet < URL: http://216.239.33.100/search?q=cache:eASXk8qC_-AC:www.caldera.com/developers/gabi/1998-04-29/ch4.s...], Pages 1-5 --

Signed and Sealed this

Twentieth Day of July, 2004

JON W. DUDAS
*Acting Director of the United States Patent and Trademark Office*